United States Patent
Xiang et al.

(10) Patent No.: US 11,909,278 B2
(45) Date of Patent: Feb. 20, 2024

(54) PRODUCTION APPARATUS OF MOTOR LAMINATED CORE AND METHOD FOR PRODUCING THE SAME

(71) Applicant: Suzhou Fine-Stamping Machinery Technology Co., Ltd, Suzhou (CN)

(72) Inventors: Yuan Xiang, Suzhou (CN); Xiudong Huang, Suzhou (CN); Renyi Yang, Suzhou (CN); Hongbo Wang, Suzhou (CN); Bo Yang, Suzhou (CN); Haodong Shi, Suzhou (CN); Bajin Wu, Suzhou (CN)

(73) Assignee: Suzhou Fine-Stamping Machinery Technology Co., Ltd, Suzhou (CN)

( * ) Notice: Subject to any disclaimer, the term of this patent is extended or adjusted under 35 U.S.C. 154(b) by 0 days.

(21) Appl. No.: 18/109,891

(22) Filed: Feb. 15, 2023

(65) Prior Publication Data
US 2023/0198354 A1    Jun. 22, 2023

(30) Foreign Application Priority Data
Dec. 21, 2022  (CN) .......................... 202211645605.7

(51) Int. Cl.
*H02K 15/02*     (2006.01)
*H02K 5/02*      (2006.01)

(52) U.S. Cl.
CPC ............ *H02K 5/02* (2013.01); *H02K 2201/09* (2013.01)

(58) Field of Classification Search
CPC ..... H02K 15/02; H02K 2201/09; H02K 15/03
USPC ........................................................ 29/596
See application file for complete search history.

(56) References Cited

U.S. PATENT DOCUMENTS

| | | | |
|---|---|---|---|
| 10,201,844 B2* | 2/2019 | Nishinaka | B21D 28/145 |
| 10,923,995 B2* | 2/2021 | Chung | H01F 41/0233 |
| 11,196,324 B2* | 12/2021 | Matsubayashi | B21D 39/03 |
| 11,451,122 B2* | 9/2022 | Oda | H02K 1/28 |
| 2014/0339929 A1 | 11/2014 | Himmel et al. | |

(Continued)

FOREIGN PATENT DOCUMENTS

| | | |
|---|---|---|
| CN | 101422763 A | 5/2009 |
| CN | 106716796 A | 5/2017 |

(Continued)

OTHER PUBLICATIONS

CNIPA, Notification of First Office Action for Chinese application CN202211645605.7, dated Feb. 3, 2023.

(Continued)

*Primary Examiner* — John K Kim

(57) ABSTRACT

Disclosed herein are a production apparatus of a motor laminated core and a method for producing the same, the production apparatus comprises an upper die assembly, a lower die assembly and an adhesive spraying device, the adhesive spraying device comprises an adhesive spraying plate, a first die plate and a second die plate successively from top to bottom, and channels are disposed between the plates, and respective channels communicate with first adhesive spraying openings and second adhesive spraying openings so as to coat an adhesive on a portion of a metal strip used for forming an core sheet, and after the core sheet is formed, a plurality of core sheets are cured and bonded at normal temperature in the production apparatus with the aid of a hydraulic cylinder so as to form a motor laminated core.

10 Claims, 18 Drawing Sheets

(56) References Cited

U.S. PATENT DOCUMENTS

| | | | |
|---|---|---|---|
| 2017/0297078 A1* | 10/2017 | Nishinaka | B05C 5/0212 |
| 2019/0109521 A1* | 4/2019 | Chung | B32B 15/011 |
| 2022/0006334 A1 | 1/2022 | Wakisaka et al. | |
| 2022/0025228 A1* | 1/2022 | Takatani | C09J 133/12 |
| 2022/0094218 A1 | 3/2022 | Ohsugi et al. | |
| 2023/0198354 A1* | 6/2023 | Xiang | H02K 15/02 29/596 |

FOREIGN PATENT DOCUMENTS

| | | |
|---|---|---|
| CN | 111632781 A | 9/2020 |
| CN | 114884292 A | 8/2022 |
| JP | S62183582 U | 11/1987 |

OTHER PUBLICATIONS

CNIPA, Notification to grant patent right for Chinese application CN202211645605.7, dated Jan. 18, 2023.

\* cited by examiner

PRODUCTION APPARATUS OF MOTOR LAMINATED CORE AND METHOD FOR PRODUCING THE SAME

TECHNICAL FIELD

The disclosure pertains to the technical field of manufacturing motor cores, and specifically pertains to a production apparatus of a motor laminated core and a method for producing the same.

BACKGROUND

A commercially available adhesive core, especially an adhesive core for a drive motor of a new energy vehicle, is formed by forming a plurality of core sheets using a production apparatus and adhering the plurality of core sheets to each other using an adhesive coated on surfaces of the core sheets in advance. Generally, the adhesive is cured by means of auxiliary electromagnetic induction heating during production. However, when the adhesive is coated, a plurality of disperse adhesive dots are required to be coated, and a plurality of adhesive spraying openings are provided. Therefore, each adhesive spraying opening is respectively butt-jointed with an adhesive spraying control device via a pipeline, so that a number of pipelines are required to be connected during assembly of a die, the pipelines need to be mounted manually one by one, and it is troublesome to butt joint the adhesive spraying control device with each adhesive spraying opening, which results in low efficiency of pipeline connection and is not conducive to overhaul. Moreover, it is also very difficult to perform subsequent cleaning and maintenance, and the adhesive amount is not easy to control when such adhesive spraying mechanism is disposed on a narrow tooth portion for adhesive spraying, and adhesive overflow phenomenon is easy to occur. In addition, the auxiliary heat curing consumes a large amount of electric energy, and it is also required to wait for a period of time before the adhesive is cured, resulting in a low production efficiency and great consumption of electric energy.

SUMMARY

In order to solve at least one technical problem mentioned above, the disclosure provides the following technical schemes:

A production apparatus of a motor laminated core is designed in the present application document, the motor laminated core is formed by laminating and bonding a plurality of core sheets to each other, and respective core sheets are formed by punching a predetermined shape on a metal strip; and the production apparatus comprises:

an upper die assembly and a lower die assembly, where the upper die assembly and the lower die assembly cooperate with each other so as to sequentially cut the metal strip conveyed step-by-step into the core sheet with the predetermined shape and blank the core sheet; and an adhesive spraying device, where the adhesive spraying device is disposed on the lower die assembly; and the adhesive spraying device comprises an adhesive spraying plate, a first die plate and a second die plate, the first die plate is located between the adhesive spraying plate and the second die plate, a first adhesive spraying area and a second adhesive spraying area located at a periphery of the first adhesive spraying area are formed on the adhesive spraying plate, a plurality of first adhesive spraying openings disposed at intervals from each other are formed in the first adhesive spraying area, and a plurality of second adhesive spraying openings disposed at intervals from each other are formed in the second adhesive spraying area, a front face of the first die plate is formed with a plurality of first diversion channels respectively communicating with the first adhesive spraying openings, a first adhesive inlet channel communicating with the first diversion channels, and a plurality of transition channels respectively communicating with the second adhesive spraying openings correspondingly, and a front face of the second die plate is formed with a plurality of second diversion channels respectively communicating with the transition channels, and a second adhesive inlet channel communicating with the second diversion channels; and the first adhesive inlet channel is disposed on the first die plate in a penetrating manner, and the second adhesive inlet channel is disposed on the second die plate in a penetrating manner.

According to the production apparatus of a motor laminated core, the front face of the first die plate is formed with a first diversion cavity, the first diversion cavity communicates with the first adhesive inlet channel, and the first diversion channels respectively communicate with the first diversion cavity.

According to the production apparatus of a motor laminated core, the front face of the second die plate is formed with a second diversion cavity, the second diversion cavity communicates with the second adhesive inlet channel, and the second diversion channels respectively communicate with the second diversion cavity.

According to the production apparatus of a motor laminated core, the front face of the first die plate and the front face of the second die plate are both formed with a plurality of communicating grooves disposed in an annular array; the communicating grooves on the first die plate are respectively located between the plurality of first diversion channels, so that the plurality of first diversion channels communicate with each other via the communicating grooves; the communicating grooves on the second die plate are respectively located between the plurality of second diversion channels, so that the plurality of second diversion channels communicate via the communicating grooves; the first adhesive spraying area and the second adhesive spraying area are both in an annular structure, positions of the communicating grooves on the first die plate are respectively disposed corresponding to a position of the first adhesive spraying area of the annular structure, positions of the communicating grooves on the second die plate are respectively disposed corresponding to a position of the second adhesive spraying area of the annular structure, and the plurality of first adhesive spraying openings are uniformly distributed at equal intervals, and the plurality of second adhesive spraying openings are uniformly distributed at equal intervals; and the first adhesive spraying openings communicate with the first diversion channels via the communicating grooves on the first die plate, the second adhesive spraying openings communicate with the second diversion channels via the transition channels and the communicating grooves on the second die plate, a third adhesive inlet channel communicating with the first adhesive inlet channel is formed on the second die plate, and the third adhesive inlet channel is disposed on the second die plate in a penetrating manner.

According to the production apparatus of a motor laminated core, the apparatus further comprises a positioning structure for guiding and limiting the metal strip during the step-by-step conveying, the positioning structure is disposed on the lower die assembly, and the positioning structure comprises a side guide plate and a magnet, the side guide plate is formed with a positioning groove, the magnet is embedded in an upper inner wall of the positioning groove, a side edge of the metal strip is located in the positioning groove, and the magnet separates the metal strip from an upper surface of the lower die assembly by a magnetic force thereof.

According to the production apparatus of a motor laminated core, a metal strip conveying channel is formed between the upper die assembly and the lower die assembly, a nozzle is disposed in front of a feeding end of the metal strip conveying channel, the nozzle sprays a mixed liquid of a stamping oil and an accelerating agent onto a surface of the metal strip, and the mixed liquid is mixed with an adhesive respectively sprayed from the first adhesive spraying openings and the second adhesive spraying openings, so that the plurality of core sheets are laminated and bonded to each other to form the motor laminated core.

According to the production apparatus of a motor laminated core, the apparatus further comprises a first adhesive spraying control device and a second adhesive spraying control device, the first adhesive spraying control device and the second adhesive spraying control device each comprise a controller, an adhesive cartridge and an adhesive control apparatus, a gas pressure reducing valve in the controller is butt-jointed with a gas inlet port of the adhesive cartridge via a gas pipeline, and the adhesive control apparatus is connected with and controlled by a control module in the controller; a discharge port of the adhesive cartridge is butt-jointed with an adhesive inlet of the adhesive control apparatus via a pipeline, a pressure sensor is mounted at an adhesive outlet of the adhesive control apparatus, and the pressure sensor is connected with and controlled by the control module in the controller; and the adhesive outlet of the adhesive control apparatus of the first adhesive spraying control device is butt-jointed with the third adhesive inlet channel via a pipeline, and the adhesive outlet of the adhesive control apparatus of the second adhesive spraying control device is butt jointed with the second adhesive inlet channel via a pipeline.

According to the production apparatus of a motor laminated core, the apparatus further comprises a lifting device; the adhesive spraying device further comprises an insert ring fixed on the second die plate, the first die plate and the adhesive spraying plate are disposed in an inner cavity of the insert ring, a protrusion is formed on an inner wall of the insert ring, a step is formed on the adhesive spraying plate, and the protrusion is limited on the step; the lifting device comprises a drawing plate and a drawing plate cushion block fixed on the second die plate, a bottom surface of the drawing plate cushion block and a top surface of the drawing plate are respectively formed with a plurality of mating tooth blocks via a plurality of mating grooves disposed at equal intervals from each other, and the mating tooth blocks are correspondingly inserted into the mating grooves; a side wall of the mating groove on the drawing plate cushion block and a side wall of the mating groove on the drawing plate are attached to each other, and both side walls attached to each other are inclined planes with a same inclination angle, and an extension section of the drawing plate penetrates through the channels and is connected with a cylinder located on the lower die assembly; a guide assembly comprises a guide post fixed on the drawing plate cushion block and a guide post bushing mounted on the lower die assembly, and the guide post is inserted into the guide post bushing; and a reset assembly comprises a sleeve mounted on the lower die assembly, and a spring and a column disposed in the sleeve, the column is connected with the drawing plate cushion block, and both ends of the spring are connected with the sleeve and the column respectively.

As another aspect, a method for producing a motor laminated core, comprises manufacturing a laminated core using the above-mentioned production apparatus of a motor laminated core, and the method comprises the following steps:

conveying a metal strip continuous step-by-step in a blanking direction, and spraying a mixed liquid for catalyzing an adhesive on an upper surface of the metal strip before entering between an upper die assembly and a lower die assembly of the production apparatus;

locating the metal strip between the upper die assembly and the lower die assembly of the production apparatus, and in the process of conveying the metal strip continuously step-by-step in the blanking direction, attaching a core sheet preforming area to an adhesive spraying device in the production apparatus, conveying the adhesive in an adhesive cartridge in a first adhesive spraying control device to first adhesive spraying openings of the adhesive spraying device via an adhesive control apparatus, conveying the adhesive in the adhesive cartridge in a second adhesive spraying control device to second adhesive spraying openings of the adhesive spraying device via the adhesive control apparatus, adhering the adhesive sprayed from the first adhesive spraying openings and the second adhesive spraying openings to a lower surface of the core sheet preforming area, and uniformly distributing adhesive dots on the lower surface of the core sheet preforming area; and in the process of conveying the metal strip continuous step-by-step, punching the core sheet preforming area coated with the adhesive on the metal strip to form core sheets, and blanking the core sheets into a blanking channel and curing and bonding with a top surface of a core sheet lamination group inside the blanking channel by contacting the adhesive with the mixed liquid so as to form a laminated core; and during the curing and bonding, bonding at 15° C. to 35° C. for 10 s to 3 min, and pressing the formed core sheet by a forming die of the upper die assembly, and subjecting the core sheet lamination group to a back pressure of a hydraulic cylinder and a clamping force of a locking ring, so that the formed core sheet is tightly and quickly bonded to the top surface of the core sheet lamination group after curing at normal temperature.

According to the method for producing a motor laminated core, the metal strip is conveyed continuously step-by-step in the blanking direction by pushing forward and pulling backward.

According to the method for producing a motor laminated core, the adhesive dots are located at an outer edge of the core sheet after the adhesive is coated.

According to the method for producing a motor laminated core, the adhesive dots are located at an edge of a shaft hole on the core sheet after the adhesive is coated.

According to the method for producing a motor laminated core, the adhesive dots are located on a periphery of a magnetic steel slot on the core sheet after the adhesive is coated.

According to the method for producing a motor laminated core, at least one adhesive dot is adhered to each of a plurality of tooth portions on the core sheet after the adhesive is coated.

Compared with the prior art, the production apparatus of a motor laminated core and the method for producing the same designed by the disclosure have the following beneficial effects:

1. The plurality of first adhesive spraying openings communicate with the first adhesive inlet channel via the first diversion channels on the first die plate, and the plurality of second adhesive spraying openings communicate with the second adhesive inlet channel via the second diversion channels on the second die plate, so that only two pipelines are respectively butt-jointed with the first adhesive inlet channel and the third adhesive inlet channel so as to input the adhesive into the first adhesive spraying openings and the second adhesive spraying openings, which solves the technical problem of requiring a number of pipelines to connect the respective adhesive spraying openings that results in relatively troublesome pipeline connection, low efficiency of pipeline installation, and inconvenience of overhaul in the prior art, further achieving fast installation of the pipelines and the adhesive spraying openings because there are a fewer pipelines, a corresponding faulty pipelines can be quickly found, which improves troubleshooting speed, facilitates cleaning, avoids frequent replacement of vulnerable parts, and benefits subsequent maintenance.
2. The diversion cavities are disposed so that the adhesive is converged in the diversion cavities and then diverted, so that the adhesive spraying openings provide a certain pressure when spraying the adhesive, and the pressure of the adhesive sprayed by each adhesive spraying opening is balanced to control the amount of the adhesive sprayed.
3. The communicating grooves are disposed so that the adhesive overflowing from a diversion channel can overflow to other diversion channels, so that the amount of the adhesive in each diversion channel is balanced, and the amount of the adhesive sprayed by each adhesive spraying opening is uniform, so that thickness of the adhesive dots coated on the core sheet is uniform, and the thickness of each motor core formed by bonding is uniform, thereby improving yield.
4. The side guide plate for guiding the strip is disposed on the side of the metal strip to position the metal strip conveyed step-by-step, and the magnet is disposed on the side guide plate to enable the metal strip to be separated from the lower die assembly, and after the separation, the metal strip is absorbed by the magnet to prevent the adhesive dots on the strip from shaking, so that mounting the magnet on the side guide plate can better lift the strip and feed the strip more smoothly.
5. The quantitative accurate adhesive spraying is realized under the control of the adhesive spraying control device, and the adhesive cured core can be produced quickly at normal temperature.
6. The lifting device is disposed so that the adhesive spraying device can be lifted and lowered vertically, and production of a rotor core or a stator core can be realized, and a rotationally bonded core can be used in a production device and reliably produced into the laminated core.

Figure 1:
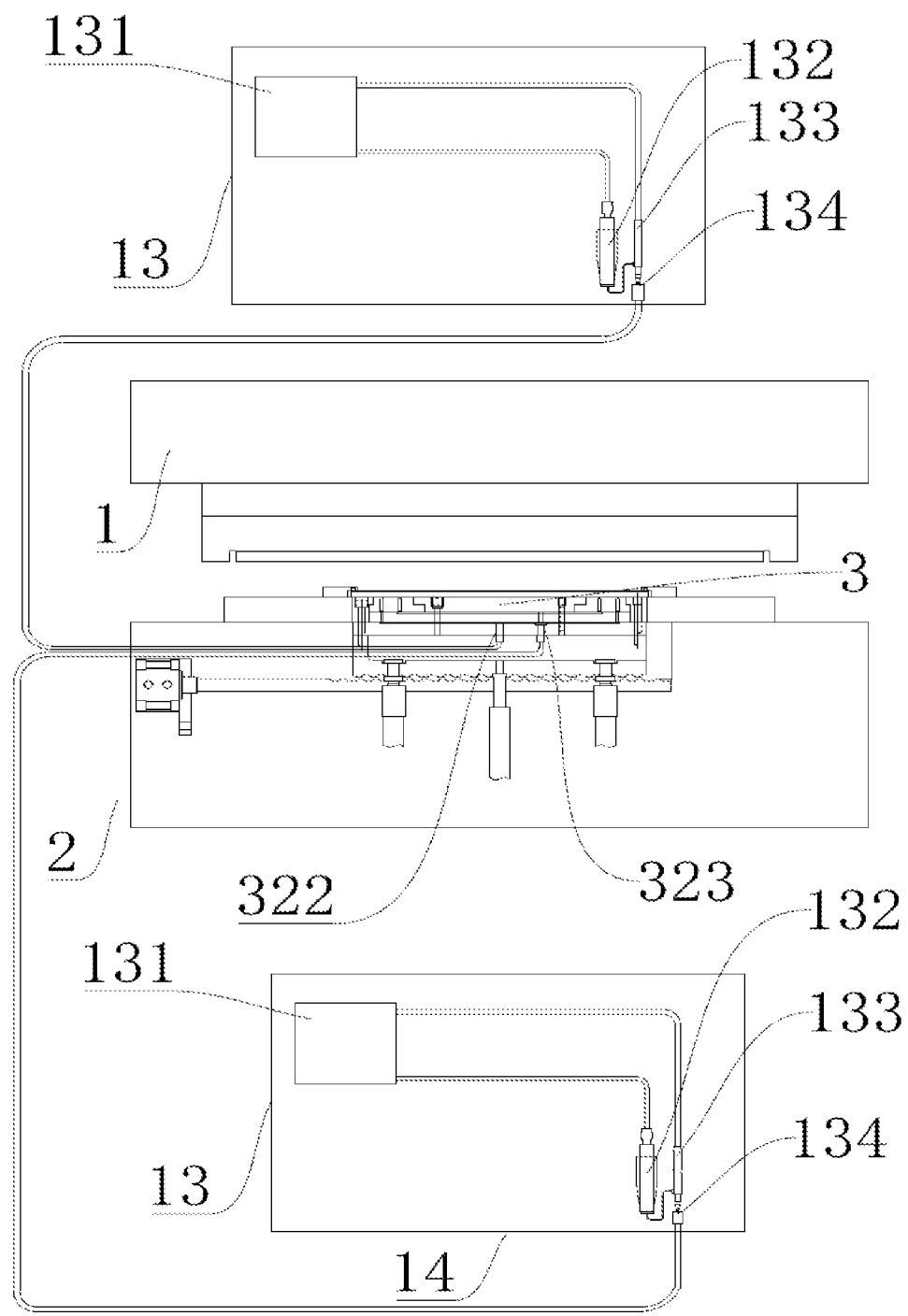
FIG. 1 is a structural diagram (I) of a production apparatus.

Reference numerals in the drawings: upper die assembly 1, lower die assembly 2, and blanking channel 21;

adhesive spraying device 3, adhesive spraying plate 30, first adhesive spraying opening 301, second adhesive spraying opening 302, step 303, second boss 331, conical cavity 305, straight channel 306, first die plate 31, transition channel 311, first diversion channel 312, first adhesive inlet channel 313, first diversion cavity 314, second die plate 32, second diversion channel 321, second adhesive inlet channel 322, third adhesive inlet channel 323, communicating groove 324, second diversion cavity 325, mandrel pressure plate 33, first boss 304, insert ring 34, protrusion 341, rubber sealing ring 35, first adhesive spraying area 36, and second adhesive spraying area 37;

lifting device 4, drawing plate cushion block 41, mating tooth block 411, mating groove 412, inclined plane 413, drawing plate 42, cylinder 43;

guide assembly 5, guide post bushing 51, and guide post 52;

reset assembly 6, sleeve 61, spring 62, and column 63;

side guide plate 7, positioning groove 71, magnet 72, nozzle 8;

roller feeder 9;

metal strip 10;

first adhesive spraying control device 13, second adhesive spraying control device 14, controller 131, adhesive cartridge 132, adhesive control apparatus 133, and pressure sensor 134;

punching forming area 101, forming station I 102, forming station II 103, forming station III 104, adhesive spraying station I 105, blanking station I 106, a forming station IV 107, forming station V 108, adhesive spraying station II 109, blanking station II 110, square stator slot 111, notch forming hole I 112, notch forming hole II 113, ventilation hole 114, rotor magnetic steel slot 115, rotor center hole 116, adhesive dot 117, rotor core sheet 118, blanking hole 119, slotted hole 120, elongated hole 122, stator slot 123, stator core sheet 124, and notch forming hole III 125.

DESCRIPTION OF THE EMBODIMENTS

The technical schemes of the embodiments of the disclosure will be described clearly and completely below with reference to the accompanying drawings in the embodiments of the disclosure, and it is obvious that the embodiments described are only some, instead of all, of the embodiments of the disclosure. All other embodiments obtained by those skilled in the art based on the embodiments of the disclosure fall within the scope of the disclosure.

Figure 2:
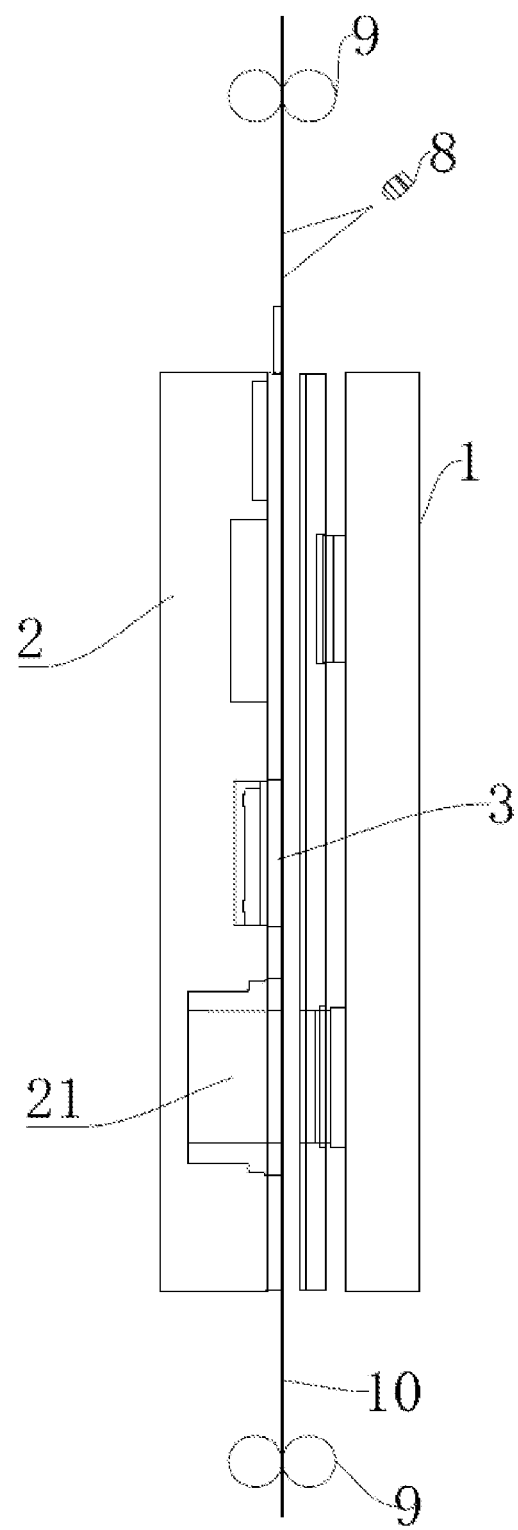
FIG. 2 is a structural diagram (II) of the production apparatus.
Figure 3:
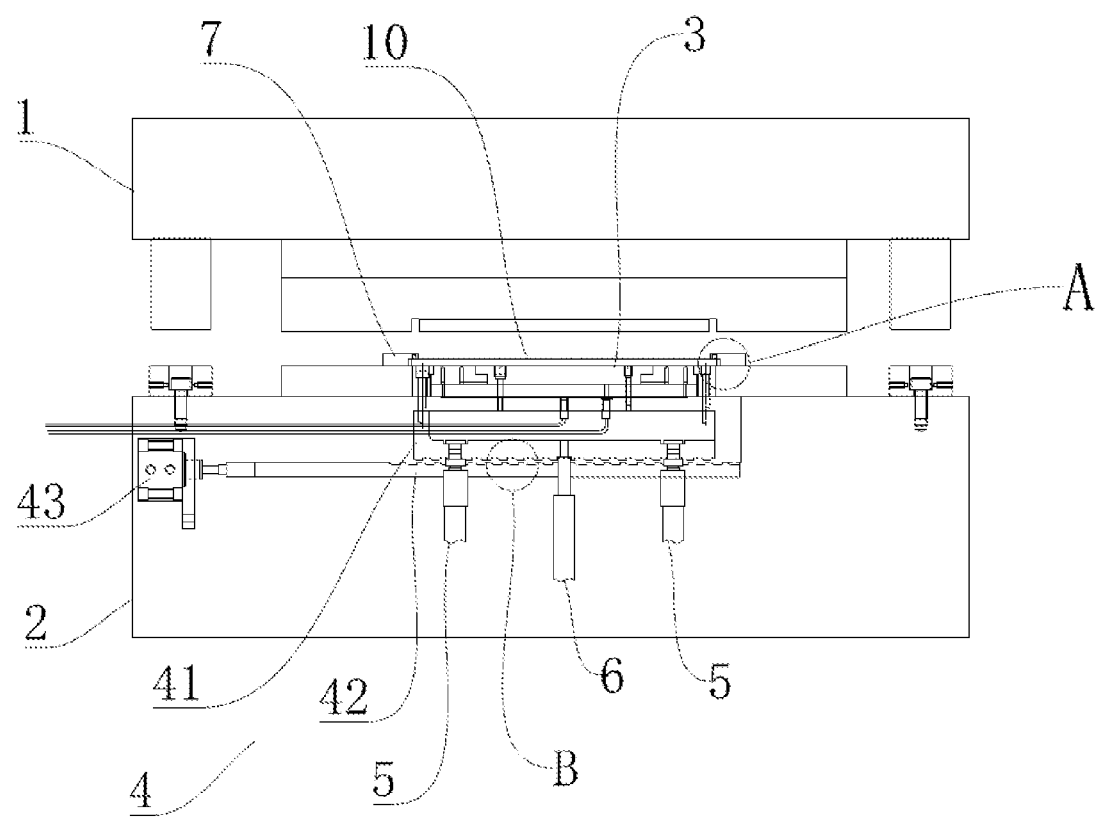
FIG. 3 is a structural diagram of the production apparatus in a die-sinking state.
Figure 4:
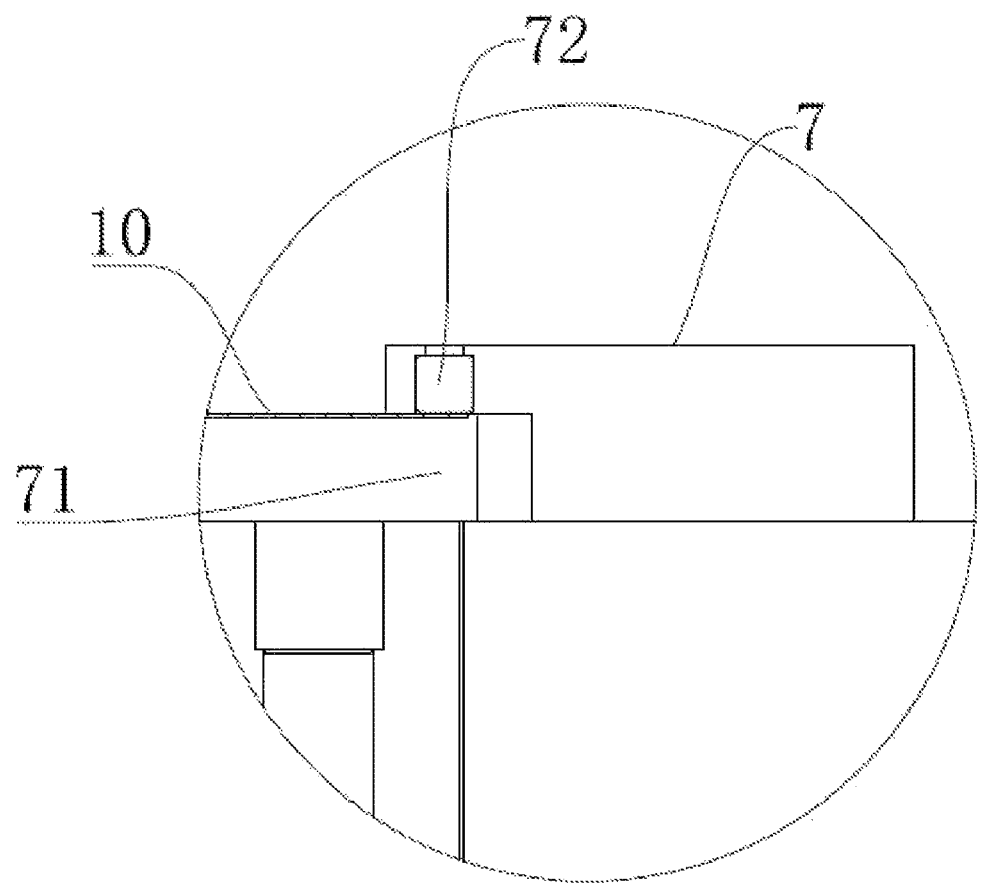
FIG. 4 is an enlarged view of A.
Figure 5:
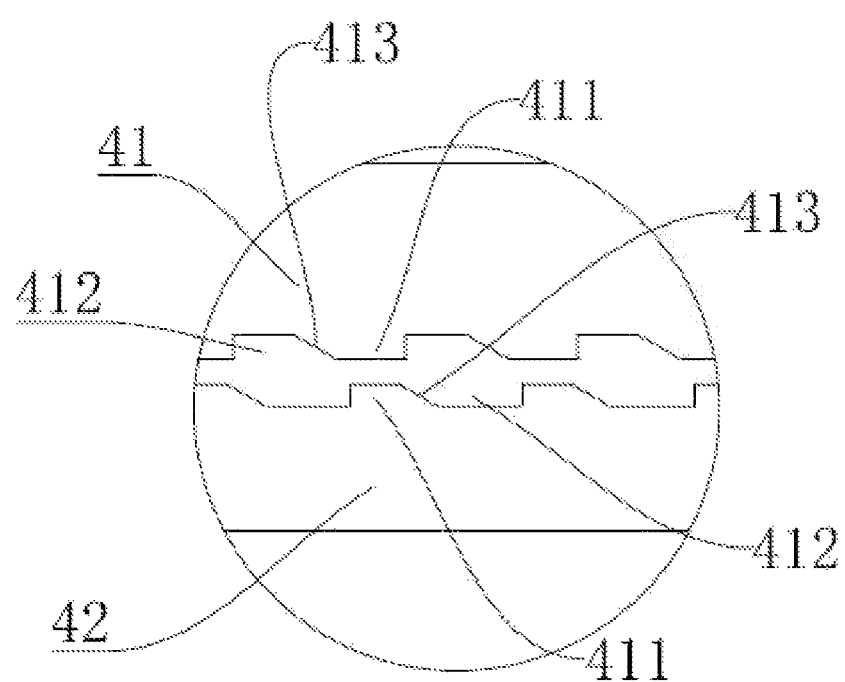
FIG. 5 is an enlarged view of B.
Figure 6:
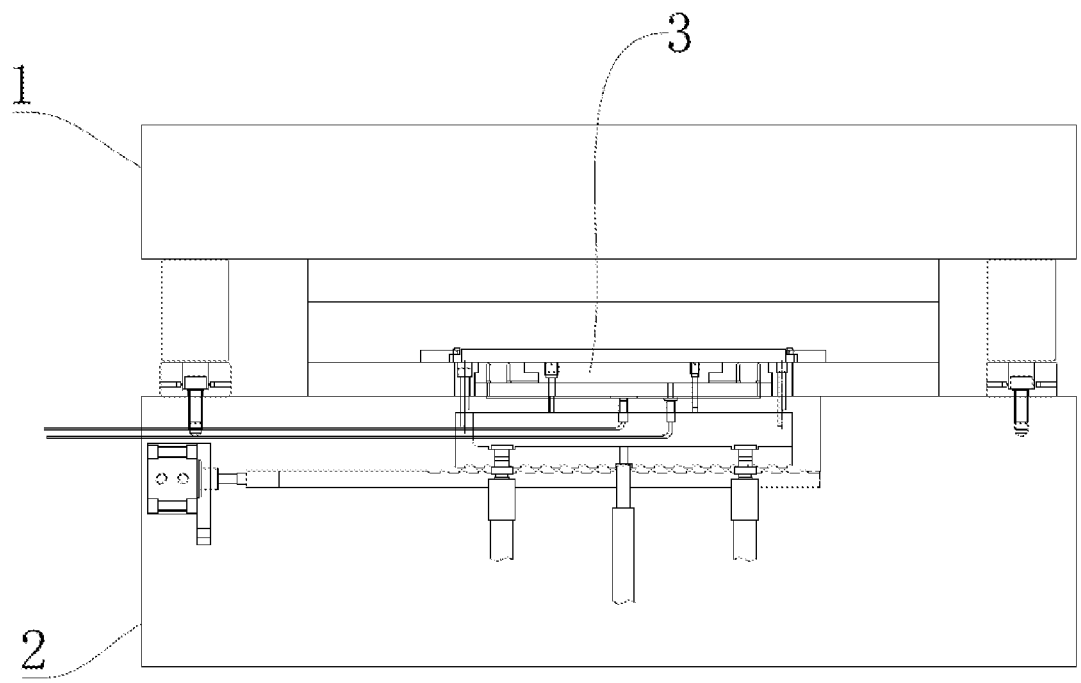
FIG. 6 is a structural diagram of the production apparatus in a clamping state.
Figure 7:
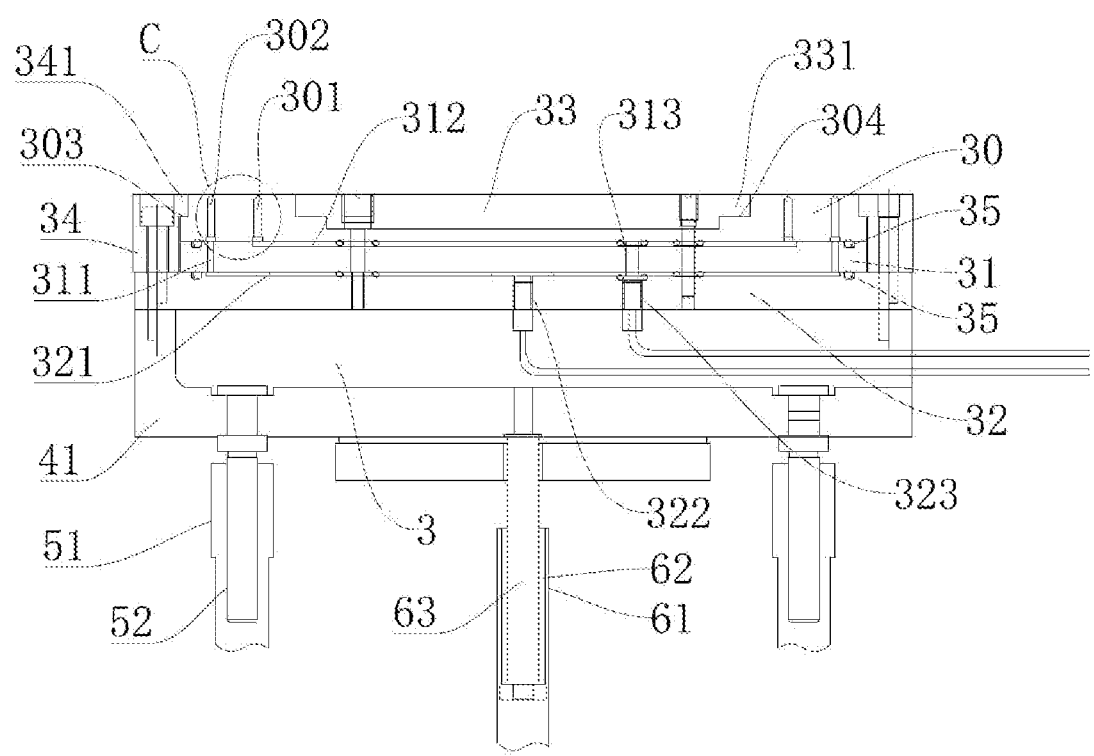
FIG. 7 is a structural diagram of an adhesive spraying device.
Figure 8:
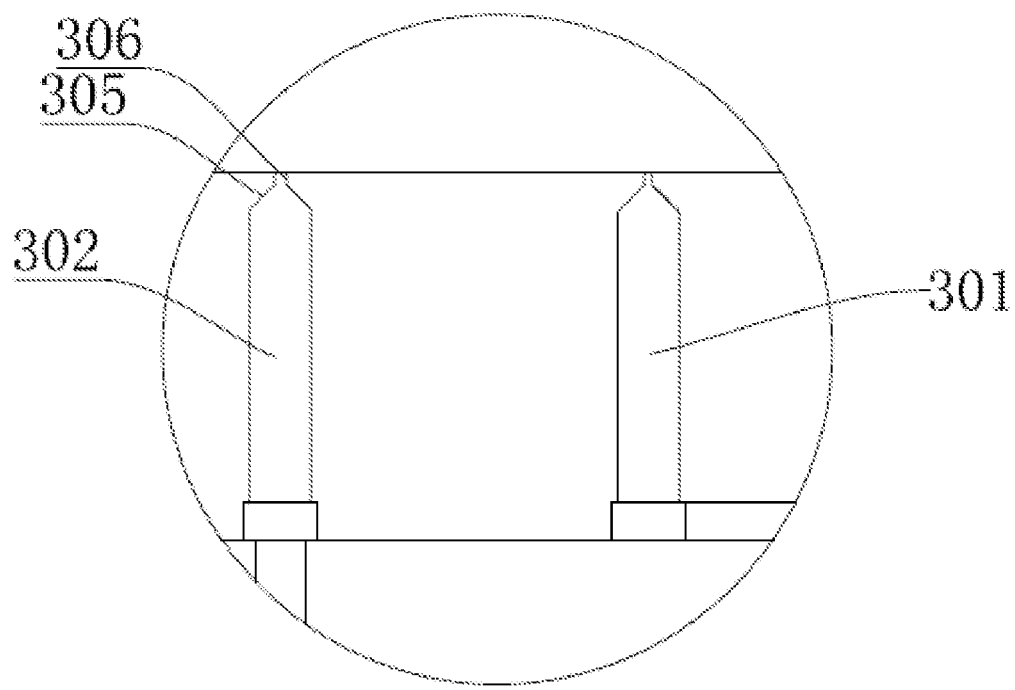
FIG. 8 is an enlarged view of C.
Figure 9:
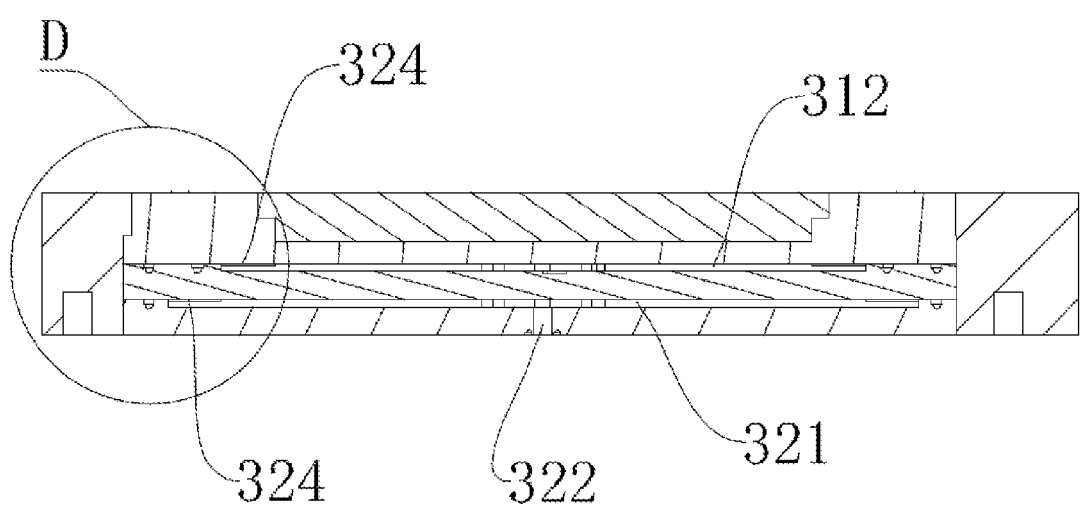
FIG. 9 is a structural diagram (I) of an adhesive spraying assembly.
Figure 10:
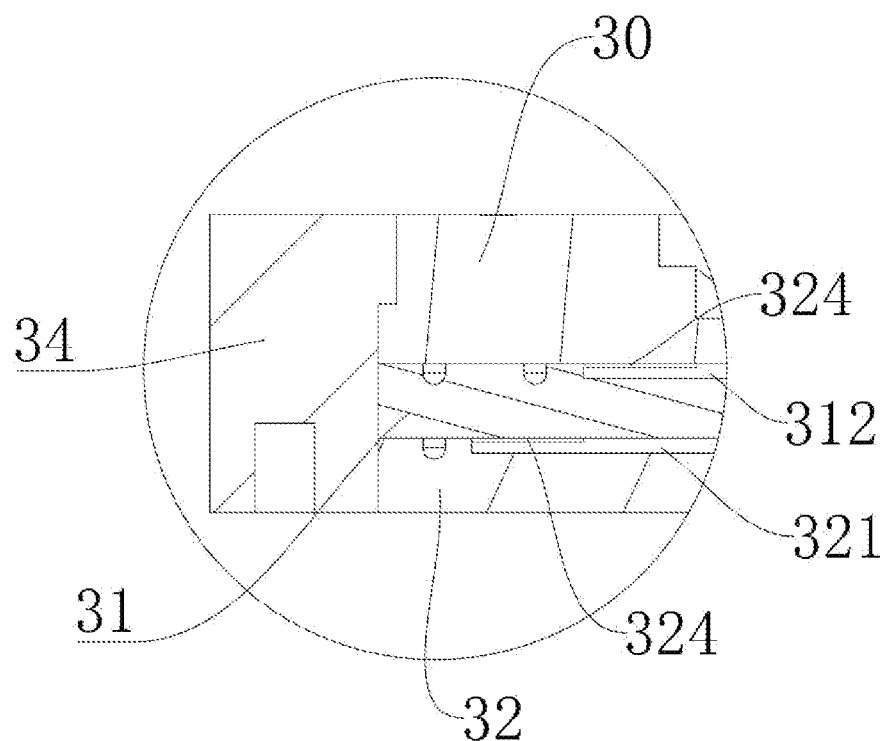
FIG. 10 is an enlarged view of D.
Figure 11:
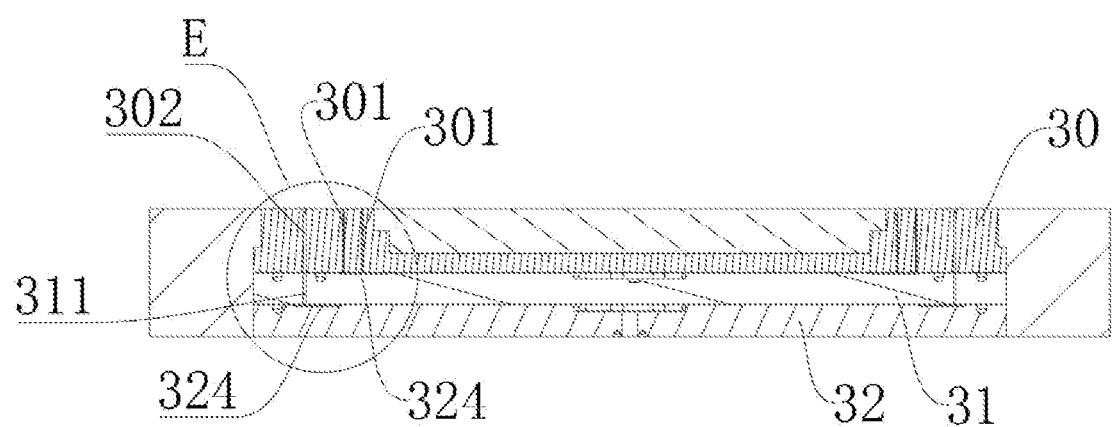
FIG. 11 is a structural diagram (II) of the adhesive spraying assembly.
Figure 12:
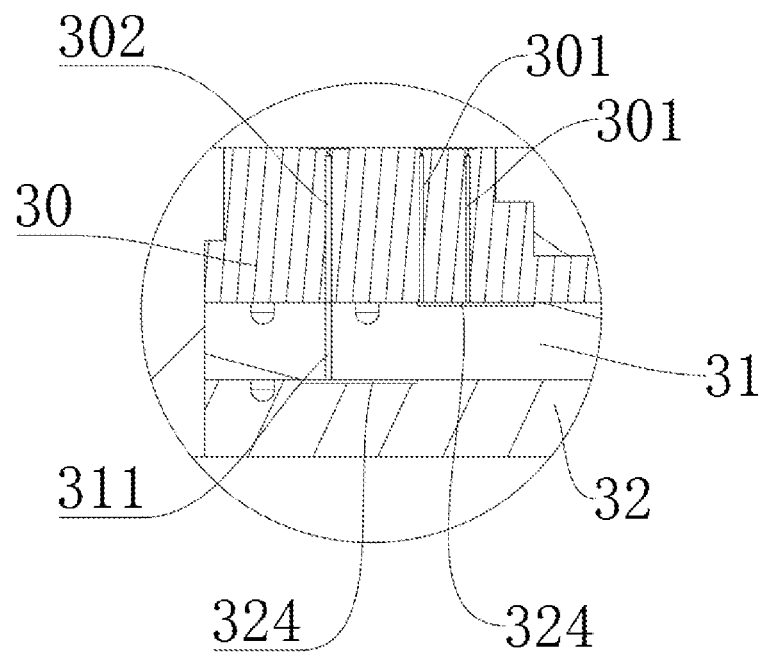
FIG. 12 is an enlarged view of E.
Figure 13:
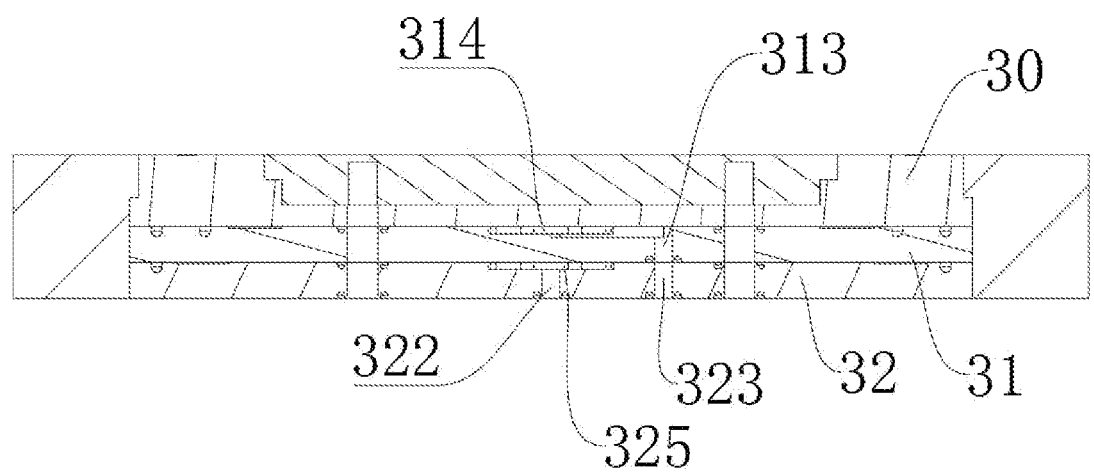
FIG. 13 is a structural diagram (III) of the adhesive spraying assembly.
Figure 14:
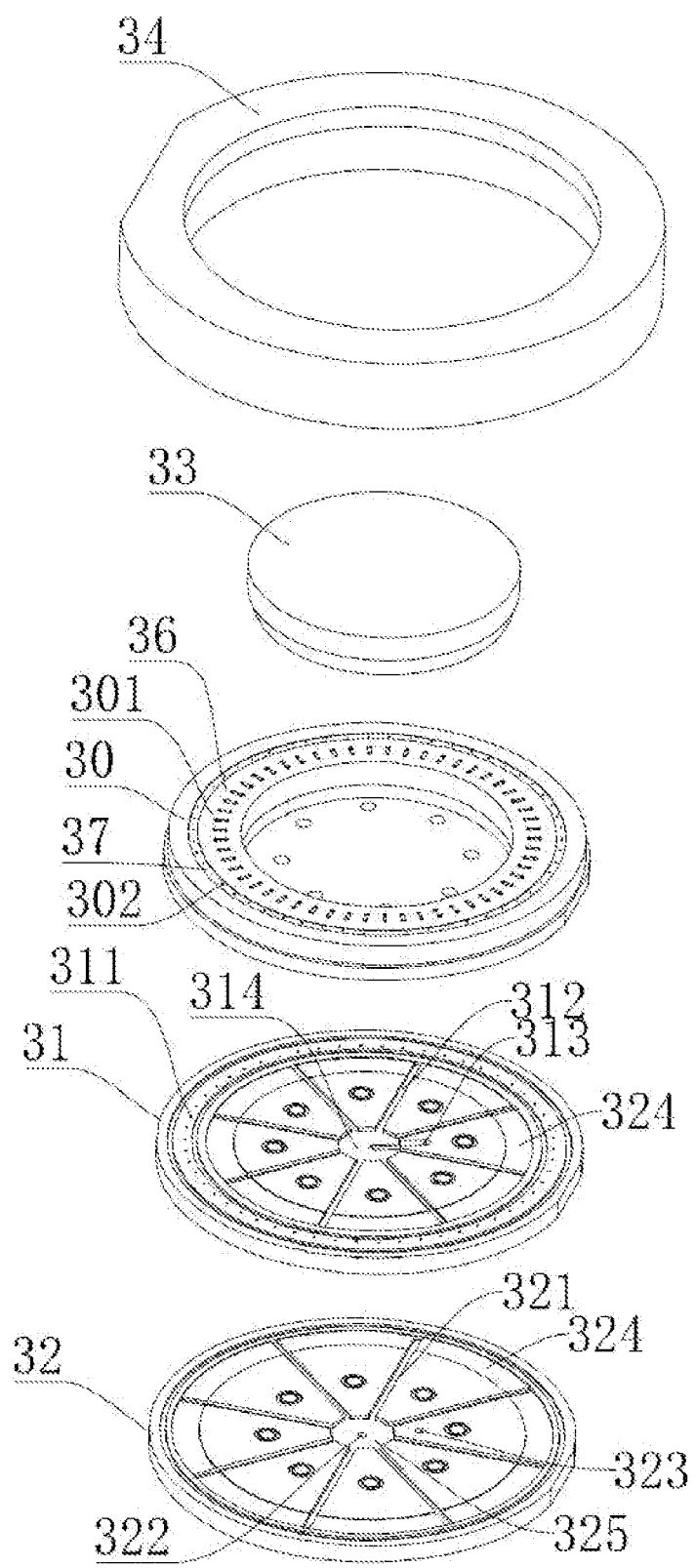
FIG. 14 is an exploded view of the adhesive spraying assembly.
Figure 15:
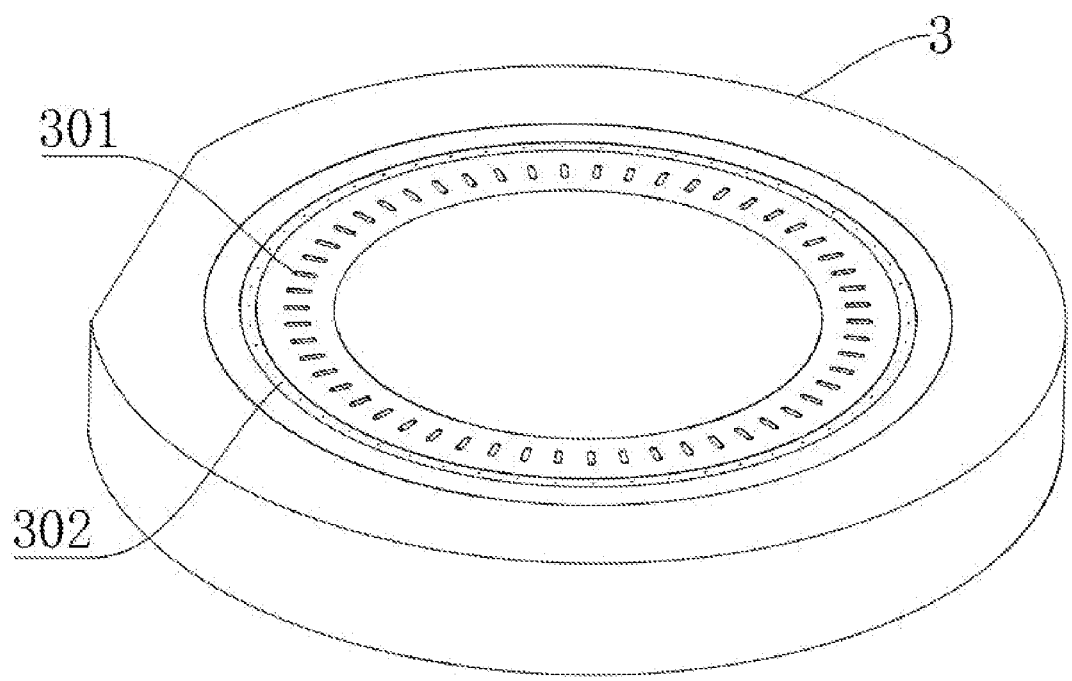
FIG. 15 is a schematic diagram of an assembled structure of the adhesive spraying assembly.
Figure 16:
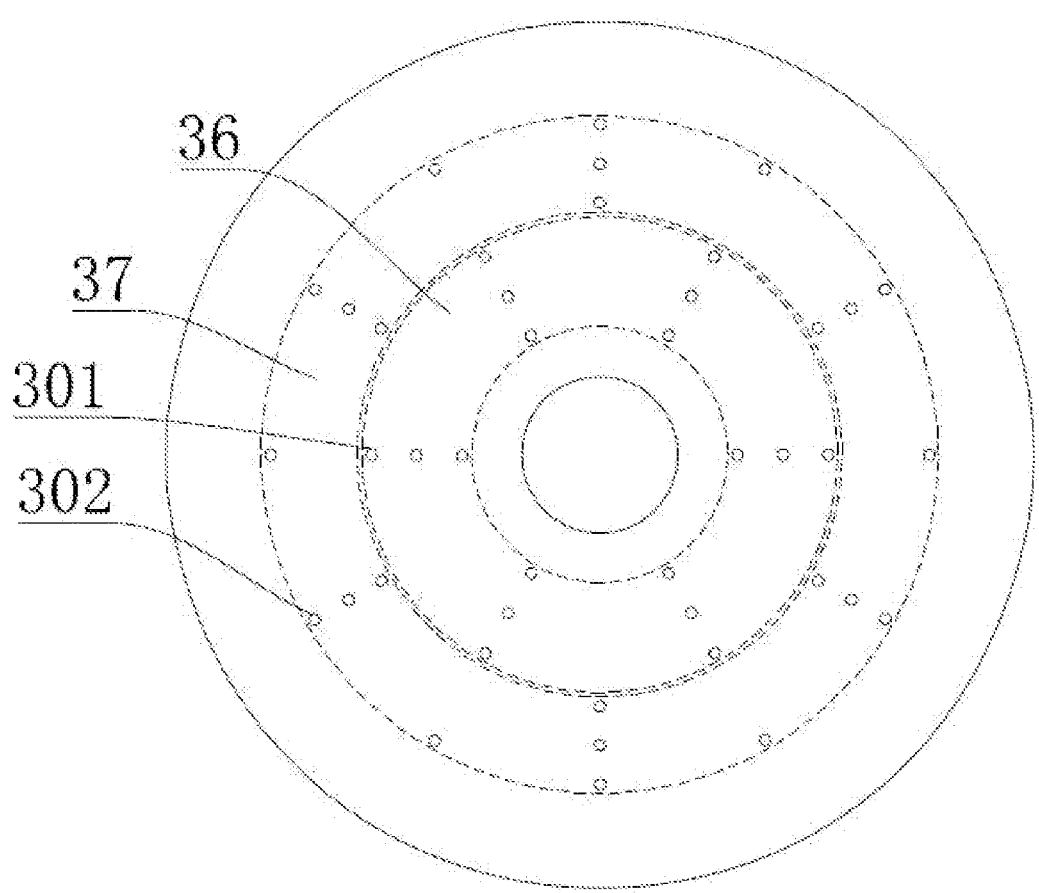
FIG. 16 is a structural diagram of distribution of first adhesive spraying openings and second adhesive spraying openings for coating an adhesive on a rotor core sheet.

FIGS. 1 to 16 illustrate a first embodiment of the disclosure, and the first embodiment describes a production apparatus of a motor laminated core, and in the first embodiment, the production apparatus of a motor laminated core specifically comprises:

The motor laminated core is formed by laminating and bonding a plurality of core sheets to each other, and respective core sheets are formed by punching a predetermined shape on a metal strip 10. The production apparatus comprises an upper die assembly 1, a lower die assembly 2, and an adhesive spraying device 3.

The upper die assembly 1 and the lower die assembly 2 cooperate with each other to successively punch a metal strip 10 conveyed step-by-step into core sheets with a predetermined shape and blank the core sheets. With regard to the step-by-step feeding, a roller feeder 9 is respectively disposed at both ends of the production apparatus, and the metal strip 10 is conveyed by pushing forward and pulling backward, and a plurality of punches and dies are respectively disposed on the upper die assembly 1 and the lower die assembly 2, so that the core sheets with the predetermined shape can be punched out.

The adhesive spraying device 3 is disposed on at least one of the upper die assembly 1 and the lower die assembly 2; the adhesive spraying device 3 is disposed corresponding to a surface of the metal strip 10 for a core sheet forming portion; the adhesive spraying device 3 comprises an adhesive spraying plate 30, a first die plate 31 and a second die plate 32; the adhesive spraying plate 30 is of a ring structure and is generally of a ring body; the first die plate 31 is disposed between the adhesive spraying plate 30 and the second die plate 32; a mandrel pressure plate 33 is disposed in an inner hole of the adhesive spraying plate 30; and an inner wall of the adhesive spraying plate 30 is formed with a first boss 304, an outer wall of the mandrel pressure plate 33 is formed with a second boss 331, the second boss 331 is pressed onto the first boss 304, and screws of a plurality of bolts respectively penetrate through the mandrel pressure plate 33 and the first die plate 31 and are then threadedly connected with threaded holes of the second die plate 32, where 9 bolts can be disposed therein; an insert ring 34 is fixed on the second die plate 32, the screws of the plurality of bolts respectively penetrate through the insert ring 34 and are threadedly connected with the threaded holes of the second die plate 32, and at least 10 bolts can be disposed therein; the first die plate 31 and the adhesive spraying plate 30 are disposed in an inner cavity of the insert ring 34; a protrusion 341 is formed on an inner wall of the insert ring 34, a step 303 is formed on the adhesive spraying plate 30, and the protrusion 341 is limited on the step 303; furthermore, the mandrel pressure plate 33 and the insert ring 34 are disposed so that the adhesive spraying plate 30, the first die plate 31 and the second die plate 32 are connected with each other so as to make the structure compact and reliable; and the adhesive spraying plate 30, the first die plate 31 and the second die plate 32 are all metal plates; and the adhesive spraying plate 30, the first die plate 31 and the second die plate 32 are sealed by a rubber sealing ring 35 to prevent adhesive leakage. The adhesive spraying device 3 is disposed in a concave cavity of the lower die assembly 2.

A first adhesive spraying area 36 and a second adhesive spraying area 37 located at a periphery of the first adhesive spraying area 36 are formed on an adhesive spraying surface of the adhesive spraying plate 30; a plurality of first adhesive spraying openings 301 disposed at intervals from each other are formed in the first adhesive spraying area 36; a plurality of second adhesive spraying openings 302 disposed at intervals from each other are formed in the second adhesive spraying area 37; upper adhesive outlet ends of the first adhesive spraying openings 301 and the second adhesive spraying openings 302 are conical cavities 305 with a lower port diameter greater than an upper port diameter; and the upper ports of the conical cavities 305 also communicate with straight channels 306, and a diameter of the straight channels 306 is consistent with an upper port diameter of the conical cavities 305, so that diameter size of adhesive dots sprayed from the first adhesive spraying openings 301 and the second adhesive spraying openings 302 is limited during adhesive spraying, avoiding excessive adhesive dot diameter.

A front face of the first die plate 31 is formed with a plurality of first diversion channels 312 respectively communicating with the first adhesive spraying openings 301, a first adhesive inlet channel 313 communicating with the first diversion channels 312, and a plurality of transition channels 311 respectively communicating with the second adhesive spraying openings 302 correspondingly; a front face of the second die plate 32 is formed with a plurality of second diversion channels 321 respectively communicating with the transition channels 311, and a second adhesive inlet channel 322 communicating with the second diversion channels 321; after a third adhesive inlet channel 323 inputs an adhesive, the adhesive enters the first adhesive spraying openings 301 via the first adhesive inlet channel 313 and the first diversion channels 312, and then is sprayed out via the straight channels 306 of the first adhesive spraying openings 301; and after the second adhesive inlet channel 322 inputs the adhesive, the adhesive enters the second adhesive spraying openings 302 via the second diversion channels 321 and the transition channels 311, and then is sprayed out via the straight channels 306 of the second adhesive spraying openings 302. Therefore, after the surface of the metal strip 10 for the core sheet forming portion is in contact with an upper surface of the adhesive spraying plate 30, the adhesive sprayed out by the first adhesive spraying openings 301 and the second adhesive spraying openings 302 is directly coated on the surface of the metal strip 10 for the core sheet forming portion; and the first adhesive inlet channel 313 is disposed on the first die plate 31 in a penetrating manner, and the second adhesive inlet channel 322 is disposed on the second die plate 32 in a penetrating manner.

In another implementation, an avoidance hole or an avoidance notch may be disposed on the second die plate (32) to expose a lower port of the first adhesive inlet channel 313, so that the first adhesive inlet channel 313 may be directly butt-jointed with an adhesive inlet pipeline.

In the present embodiment, the front face of the first die plate 31 is formed with a first diversion cavity 314, the first diversion cavity 314 communicates with the first adhesive inlet channel 313, and the first diversion channels 312 respectively communicate with the first diversion cavity 314. The first diversion cavity 314 is used for converging the adhesive input by the first adhesive inlet channel 313 and the third adhesive inlet channel 323, and after the first diversion cavity 314 is filled with the adhesive, the adhesive enters the first diversion channels 312 so that the first adhesive spraying openings 301 have a relatively high pressure to spray the adhesive. The first diversion cavity 314 limits the amount, pressure and the like of the adhesive sprayed from the adhesive spraying openings at the single area so as to achieve accurate quantitative adhesive spraying at each position.

In the present embodiment, the front face of the second die plate 32 is formed with a second diversion cavity 325, the second diversion cavity 325 communicates with the second adhesive inlet channel 322, and the second diversion channels 321 respectively communicate with the second diversion cavity 325. The second diversion cavity 325 is used for converging the adhesive input by the second adhesive inlet channel 322, and after the second diversion cavity 325 is filled with the adhesive, the adhesive enters the second diversion channels 321 so that the first adhesive spraying openings 301 have a relatively high pressure to spray the adhesive. The second diversion cavity 325 limits the amount, pressure and the like of the adhesive sprayed from the adhesive spraying openings at the single area so as to achieve accurate quantitative adhesive spraying at each position.

In the present embodiment, the first adhesive spraying area 36 and the second adhesive spraying area 37 are both in an annular structure, and are generally in a circular ring shape, and the plurality of first adhesive spraying openings 301 are uniformly distributed at equal intervals, and the plurality of second adhesive spraying openings 302 are uniformly distributed at equal intervals, so that the adhesive dots coated on the surface of the metal strip 10 for the core sheet forming portion are uniformly distributed, achieving a stable and reliable fixed connection between the core sheets.

In the present embodiment, the front face of the first die plate 31 and the front face of the second die plate 32 are both formed with a plurality of communicating grooves 324 disposed in an annular array, so that the plurality of first diversion channels 312 communicate with each other via the communicating grooves 324 on the first die plate 31, and the plurality of second diversion channels 321 communicate with each other via the communicating grooves 324 on the second die plate 32, so that excessive adhesive in a certain diversion channel can be diverted to other diversion channels on the corresponding die plate via the communicating grooves 324.

Specifically, the communicating grooves 324 on the first die plate 31 are respectively located between the plurality of first diversion channels 312, so that the plurality of first diversion channels 312 communicate with each other via the communicating grooves 324; positions of the communicating grooves 324 on the first die plate 31 are respectively disposed corresponding to a position of the first adhesive spraying area 36 of the annular structure; the first adhesive spraying openings 301 communicate with the first diversion channels 312 via the communicating grooves 324 on the first die plate 31; a third adhesive inlet channel 323 communicating with the first adhesive inlet channel 313 is formed on the second die plate 32; the second adhesive inlet channel 322 and the third adhesive inlet channel 323 are disposed on the second die plate 32 in a penetrating manner; when the third adhesive inlet channel 323 inputs the adhesive, the adhesive enters the first adhesive spraying openings 301 via the first adhesive inlet channel 313, the first diversion channels 312, the first diversion cavity 314 and the communicating grooves 324, finally is sprayed out via the straight channels 306 of the first adhesive spraying openings 301, and is directly coated on the surface of the metal strip 10 for the core sheet forming portion.

Specifically, the communicating grooves 324 on the second die plate 32 are respectively located between the plurality of second diversion channels 321, so that the plurality of second diversion channels 321 communicate with each other via the communicating grooves 324; positions of the communicating grooves 324 on the second die plate 32 are respectively disposed corresponding to a position of the second adhesive spraying area 37 of the annular structure, and the second adhesive spraying openings 302 communicates with the second diversion channels 321 via the transition channels 311 and the communicating grooves 324 on the second die plate 32; when the second adhesive inlet channel 322 inputs the adhesive, the adhesive enters the second adhesive spraying openings 302 via the second diversion channels 321, the second diversion cavity 325, the communicating grooves 324 and the transition channels 311, finally is sprayed out via the straight channels 306 of the second adhesive spraying openings 302, and is directly coated on the surface of the metal strip 10 for the core sheet forming portion.

In the above description, the front face of the first die plate 31 is a side facing the adhesive spraying plate 30, and the front face of the second die plate 32 is a side facing the first die plate 31.

In the present embodiment, the production apparatus further comprises positioning structures for guiding and limiting the metal strip 10 during the step-by-step conveying, there may be two positioning structures, and the two positioning structures are respectively disposed on the left and right sides of the lower die assembly 2, where the positioning structures each comprise a side guide plate 7 and a magnet 72, the side guide plate 7 is formed with a positioning groove 71, the magnet 72 is embedded in an upper inner wall of the positioning groove 71, a side edge of the metal strip 10 is located in the positioning groove 71, and the magnet 72 separates the metal strip 10 from an upper surface of the lower die assembly 2 by a magnetic force thereof so as to ensure that the metal strip 10 is adsorbed by the magnet 72 after the separation and prevent the metal strip 10 from shaking, further preventing the adhesive dots on the metal strip 10 from shaking, and avoiding shapes of the adhesive dots adhering to the metal strip 10 from changing. Therefore, the side guide plate 7 and the magnet 72 are disposed to allow smooth lifting and feeding of the metal strip. Since a roller feeder 9 is respectively disposed at both ends of the production apparatus for the step-by-step feeding, and the metal strip 10 is conveyed by pushing forward and pulling backward, the metal strip 10 is adsorbed by the magnet 72, thereby serving a function of lifting the metal strip. It is also possible to feed the metal strip 10 step-by-step in the case of adsorption, and since the metal strip 10 is made of a silicon steel sheet, it can be adsorbed by the magnet 72.

In the present embodiment, a metal strip conveying channel is formed between the upper die assembly 1 and the lower die assembly 2, a nozzle 8 is disposed in front of a feeding end of the metal strip conveying channel, the nozzle 8 sprays a mixed liquid of a stamping oil and an accelerating agent onto the surface of the metal strip 10, and the mixed liquid is mixed with the adhesive respectively sprayed from the first adhesive spraying openings 301 and the second adhesive spraying openings 302, so that the plurality of core sheets are laminated and bonded to each other to form the motor laminated core. The mixed liquid has the function of catalyzing the adhesive, and the adhesive is an anaerobic acrylate adhesive, so that curing can be achieved under a normal temperature environment after being composited with each other, so as to realize bonding between the plurality of core sheets.

In the present embodiment, the production apparatus further comprises a first adhesive spraying control device 13 and a second adhesive spraying control device 14, the first adhesive spraying control device 13 and the second adhesive spraying control device 14 each comprise a controller 131, an adhesive cartridge 132 and an adhesive control apparatus 133, a gas pressure reducing valve in the controller 131 is butt-jointed with a gas inlet port of the adhesive cartridge 132 via a gas pipeline, and the adhesive control apparatus 133 is connected with and controlled by a control module in the controller 131; a discharge port of the adhesive cartridge 132 is butt-jointed with an adhesive inlet of the adhesive control apparatus 133 via a pipeline, a pressure sensor 134 is mounted at an adhesive outlet of the adhesive control apparatus 133, and the pressure sensor 134 is connected with and controlled by the control module in the controller 131; when the pressure sensor 134 detects excessively high pressure due to pipeline blockage, the pressure sensor 134 gives an alarm; and when a pipeline joint has a failed seal, the pressure is too low, and the pressure sensor 134 gives an alarm; where the adhesive outlet of the adhesive control apparatus 133 of the first adhesive spraying control device 13 is butt-jointed with the third adhesive inlet channel 323 via a pipeline, and the adhesive outlet of the adhesive control apparatus 133 of the second adhesive spraying control device 14 is butt-jointed with the second adhesive inlet channel 322 via a pipeline, where the control module is of a PLC controller, the gas pressure reducing valve is of an electric proportional pressure reducing valve, and the PLC controller controls an air inlet pressure of the electric proportional pressure reducing valve according to a punching speed of a punching machine and a set value of the adhesive discharge amount; and the adhesive control apparatus 133 which controls the first adhesive spraying control device 13 operates to output the adhesive to the first adhesive spraying openings 301 and the adhesive control apparatus 133 which controls the second adhesive spraying control device 14 operates to output the adhesive to the second adhesive spraying openings 302, so that the adhesive spraying amount of each adhesive spraying is accurately controlled, the adhesive output by the adhesive control apparatus 133 during operation is provided by the adhesive cartridge 132 outputting the adhesive, and the adhesive control apparatus 133 uses a screw pump.

In the present embodiment, the production apparatus further comprises a lifting device 4; the lifting device 4 comprises a drawing plate 42, and a drawing plate cushion block 41 fixed on the second die plate 32, a bottom surface of the drawing plate cushion block 41 and a top surface of the drawing plate 42 are respectively formed with a plurality of mating tooth blocks 411 via a plurality of mating grooves 412 disposed at equal intervals from each other, and the mating tooth blocks 411 are correspondingly inserted into the mating grooves 412; a side wall of the mating groove 412 on the drawing plate cushion block 41 and a side wall of the mating groove 412 on the drawing plate 42 are attached to each other, both side walls attached to each other are inclined planes 413 with a same inclination angle, and an extension section of the drawing plate 42 penetrates through the channels and is connected with a cylinder 43 located on the lower die assembly 2; when punching of one motor laminated core or core sheet is completed and the punching of a second motor laminated core or core sheet starts, the cylinder 43 pulls the drawing plate 42, so that the mating tooth blocks 411 are disposed into the mating grooves 412, thereby forcing the adhesive spraying plate 30 to be 1 mm to 2 mm lower than a top surface of the lower die assembly 2, so that even if there is residual adhesive on the adhesive spraying plate 30 before, the adhesive will not stick to the metal strip, and the metal strip is kept clean during the conveying. If the remaining adhesive is adhered to the metal strip, perpendicularity, flatness, roundness and other tolerance of form and position of the core formed by the bonding may fail to meet the requires, resulting scrapping of the core. A plurality of bolts respectively penetrate through the insert ring 34 and the second die plate 32 in turn and are then threadedly connected with threaded holes of the drawing plate cushion block 41, and there may be at least five bolts therein.

The drawing plate cushion block 41 is provided with a cavity for receiving a joint butt-jointing the second adhesive inlet channel 322 and the third adhesive inlet channel 323.

In the present embodiment, a guide assembly 5 comprises a guide post 52 fixed on the drawing plate cushion block 41 and a guide post bushing 51 mounted on the lower die assembly 2, and the guide post 52 is inserted into the guide post bushing 51; when the drawing plate cushion block 41 performs an up-and-down lifting motion, the guide post 52 performs telescopic motion in the guide post bushing 51, so that the adhesive spraying device 3 performs stable and reliable up-and-down motion and always maintains an up-and-down direction motion; and the guide post bushing can be of a ball guide post bushing 51, so that the guide post 52 moves smoothly in the guide post bushing 51.

In the present embodiment, a reset assembly 6 comprises a sleeve 61 mounted on the lower die assembly 2, and a spring 62 and a column 63 disposed in the sleeve 61, the column 63 is connected with the drawing plate cushion block 41, and both ends of the spring 62 are respectively connected with the sleeve 61 and the column 63; when the cylinder 43 pulls the drawing plate 42 so that the adhesive spraying device 3 rises, the drawing plate 42 is pulled again so that the mating tooth blocks 411 correspond to the mating grooves 412; at this moment, the adhesive spraying device 3 is driven to move downwards under the action of the spring 62, and the mating tooth blocks 411 correspondingly fall into the mating grooves 412; and such structure is disposed to realize the function of resetting and moving the adhesive spraying device 3 downwards.

A core is produced based on the above-mentioned production apparatus of a motor laminated core, and the method comprises the following steps:

conveying a metal strip 10 continuously step-by-step in a blanking direction, and spraying a mixed liquid for catalyzing an adhesive on an upper surface of the metal strip 10 before entering between an upper die assembly 1 and a lower die assembly 2 of the production apparatus, where catalyzing means that the mixed liquid and the adhesive can react chemically.

disposing the metal strip 10 between the upper die assembly 1 and the lower die assembly 2 of the production apparatus, and in the process of the continuous step-by-step conveying in the blanking direction, attaching a core sheet preforming area to an adhesive spraying device 3 located in front of a blanking station in the production apparatus, conveying the adhesive in an adhesive cartridge 132 in a first adhesive spraying control device 13 to first adhesive spraying openings 301 of the adhesive spraying device 3 via an adhesive control apparatus 133, conveying the adhesive in the adhesive cartridge 132 in a second adhesive spraying control device 14 to second adhesive spraying openings 302 of the adhesive spraying device 3 via the adhesive control apparatus 133, adhering the adhesive sprayed from the first adhesive spraying openings 301 and the second adhesive spraying openings 302 to a lower surface of the core sheet preforming area, and uniformly distributing adhesive dots 117 on the lower surface of the core sheet preforming area.

in the process of conveying the metal strip 10 continuously step-by-step, punching the core sheet preforming area coated with the adhesive on the metal strip 10 to form core sheets, and blanking the core sheets into a blanking channel 21 and curing and bonding with a top surface of a core sheet lamination group inside the blanking channel by contacting the adhesive with the mixed liquid so as to form a laminated core; and during the curing and bonding, bonding at 15° C. to 35° C. for 10 s to 3 min, and pressing the formed core sheet by a forming die of the upper die assembly 1, and subjecting the core sheet lamination group to a back pressure of a hydraulic cylinder and a clamping force of a locking ring, so that the formed core sheet is tightly bonded to the top surface of the core sheet lamination group. The temperature range of 15° C. to 35° C. is generally a normal temperature range, but 20° C. to 25° C. is preferred in the present embodiment; and rapid bonding is completed within the time range of 10 s to 3 min. However, curing for about 10 s or more is preliminary curing, the preliminary curing achieves the effect that cannot be separated manually, and curing for 3 min can reach complete curing.

According to the method for producing a motor laminated core, the adhesive dots are located at an outer edge of the core sheet after the adhesive is coated, or the adhesive dots are located at an edge of a shaft hole on the core sheet after the adhesive is coated, or the adhesive dots are located on a periphery of a magnetic steel slot on the core sheet after the adhesive is coated, or At least one adhesive dot is adhered to each of the plurality of tooth portions on the core sheet after the adhesive coating, two or three adhesive dots can be adhered to each of the tooth portions when the tooth portions are long, the tooth portions are formed by forming a plurality of groove shapes on a rotor or stator, and positions of the adhesive dots are disposed so that vibration and noise of the motor core of the motor are greatly reduced.

Figure 17:
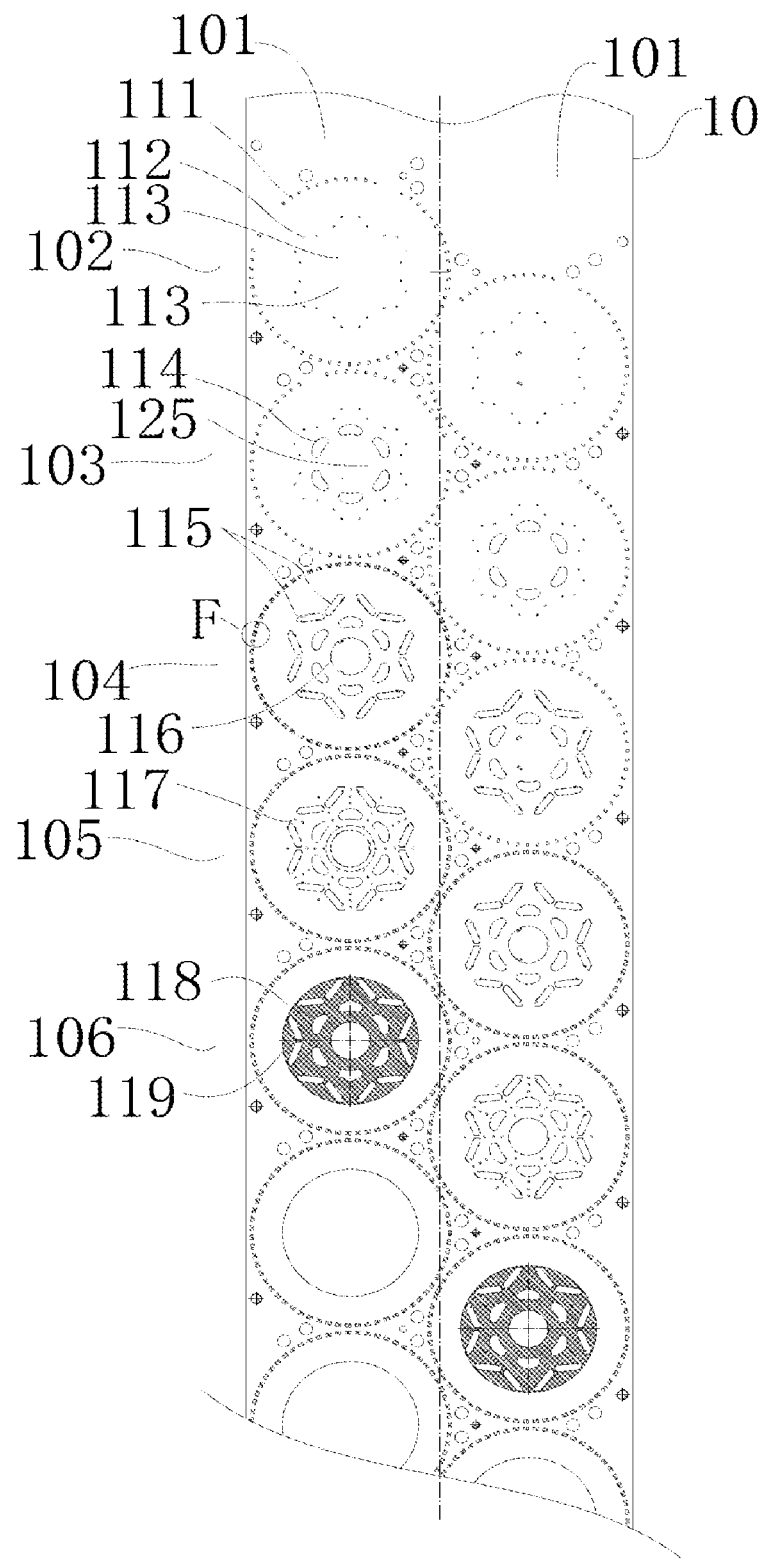
FIG. 17 is a schematic diagram (I) of a partial layout for producing a rotor laminated core and a stator laminated core.
Figure 18:
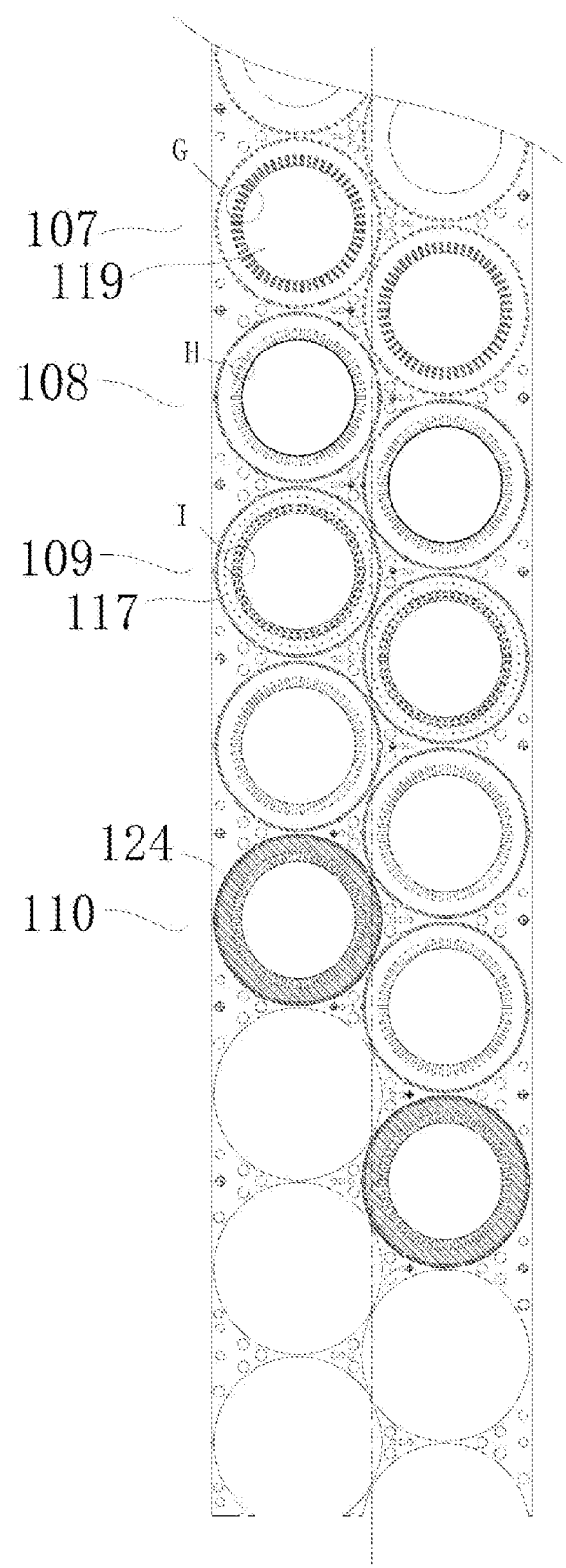
FIG. 18 is a schematic diagram (II) of the partial layout for producing the rotor laminated core and the stator laminated core.
Figure 19:
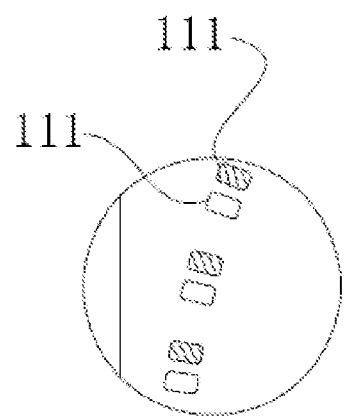
FIG. 19 is an enlarged view of F.
Figure 20:
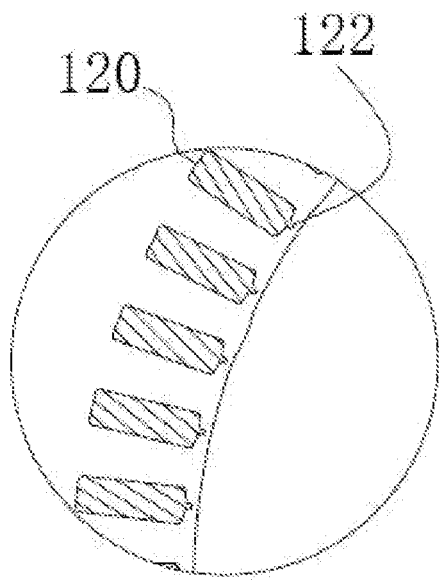
FIG. 20 is an enlarged view of G.
Figure 21:
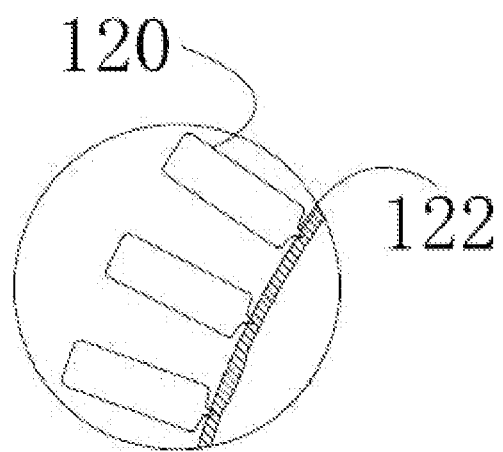
FIG. 21 is an enlarged view of H.
Figure 22:
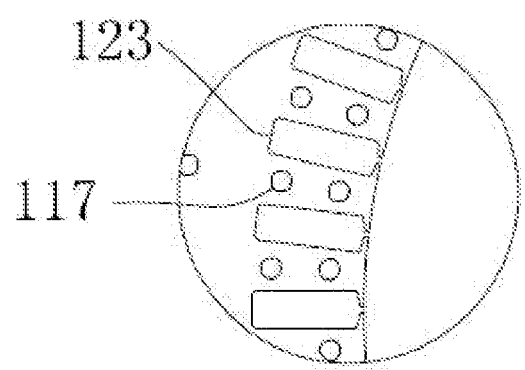
FIG. 22 is an enlarged view of I.

FIGS. 17 to 21 illustrate a second embodiment of the disclosure, and the second embodiment describes a method for producing a motor laminated core, and in the second embodiment, the method for producing a motor laminated core specifically comprises the following steps:

Manufacturing a rotor core and a stator core on the basis of the production apparatus of a motor laminated core and the method for producing the same according to the first embodiment, where a mixed liquid spraying station is disposed at the strip feeding end of the production apparatus, and the production apparatus successively comprises a forming station I 102 for forming a notch forming hole I 112, a notch forming hole II 113 and a square stator slot 111; a forming station II 103 for forming a ventilation hole 114 and a notch forming hole III 125; a forming station III 104 for forming a rotor magnetic steel slot 115, a rotor center hole 116 and reforming the square stator slot 111; an adhesive spraying station I 105 with an adhesive spraying device 3; a blanking station I 106 for forming a rotor core sheet 118; a forming station IV 107 for forming a slotted hole 120 and an elongated hole 122; a forming station V 108 for forming a stator slot and a stator shaft hole; an adhesive spraying station II 109 with an adhesive spraying device 3; and a blanking station II 110 for forming a stator core sheet 124, the rotor core sheet and the stator core sheet are formed using the above-mentioned apparatus, and the adhesive is coated before the core sheets are blanked, and the specific steps thereof are as follows:

Step S1, conveying a metal strip 10 continuously step-by-step in a blanking direction, and spraying a mixed liquid for catalyzing an adhesive on an upper surface of the metal strip 10 before entering between an upper die assembly 1 and a lower die assembly 2 of the production apparatus; since contact of the mixed liquid with anaerobic acrylate adhesives can result in a rapid chemical reaction, so that a plurality of formed core sheets can be laminated in the production apparatus and cured and bonded under the above time and temperature conditions.

Step S2, disposing the metal strip 10 between the upper die assembly 1 and the lower die assembly 2 of the production apparatus, conveying the metal strip continuously step-by-step in the blanking direction, and synchronously punching a plurality of rows of punching forming areas 101 of the metal strip 10 so as to form a rotor center hole 116 with a notch in each forming area, a plurality of ventilation holes 114 surrounding the rotor center hole 116 and a plurality of rotor magnetic steel slots 115, and a plurality of square stator slots 111 located at peripheries of the plurality of rotor magnetic steel slots 115 and disposed in an annular array, where the rotor magnetic steel slots 115 are located at peripheries of through holes, thereby defining a rotor core sheet preforming area via the peripheries of the rotor magnetic steel slots 115, and the step provides corresponding structures and conditions for the punching and forming of the rotor core sheet 118, and prepare for the forming of a subsequent rotor core sheet 118 in advance.

Step S3, in the process of continuously conveying the metal strip 10 step-by-step, attaching the rotor core sheet preforming area to the adhesive spraying device 3 located in front of a rotor blanking station in the production apparatus, conveying the adhesive in the adhesive cartridge 132 in the first adhesive spraying control device 13 to the first adhesive spraying openings 301 of the adhesive spraying device 3 via the adhesive control apparatus 133, conveying the adhesive in the adhesive cartridge 132 in the second adhesive spraying control device 14 to the second adhesive spraying openings 302 of the adhesive spraying device 3 via the adhesive control apparatus 133, adhering the adhesive sprayed from the first adhesive spraying openings 301 and the second adhesive spraying openings 302 to a lower surface of the rotor core sheet preforming area, and uniformly distributing the adhesive dots 117 respectively between the ventilation holes 114 and between the rotor magnetic steel slots 115, where positions of the first adhesive spraying openings 301 are respectively disposed corresponding to adhesive dot positions between the ventilation holes 114, and positions of the second adhesive spraying openings 302 are respectively disposed corresponding to adhesive dot positions between the rotor magnetic steel slots 115, so that the adhesive can be effectively coated, and the adhesive is also brought into effective contact with the accelerating agent.

Step S4, in the process of continuously conveying the metal strip 10 step-by-step, punching the rotor core sheet preforming area sprayed with the adhesive dots 117 to form the rotor core sheets 118, and blanking the same into the blanking channel 21 to cure and bond at normal temperature to a top surface of a rotor core sheet lamination group therein through contact between the adhesive and the mixed liquid so as to form a rotor core, where a support hydraulic cylinder is disposed at a lower end surface of the rotor core sheet lamination group in the blanking channel 21, and the support hydraulic cylinder is controlled to descend by a distance equal to the thickness of one rotor core sheet 118 once a rotor core sheet 118 is punched, so that the subsequent core sheets obtained by punching and forming are laminated and bonded, and the normal temperature means 15° C. to 35° C., and preferably 20° C. to 25° C. in the present embodiment.

Step S5, in the process of continuously conveying the metal strip 10 step-by-step, punching peripheries of a blanking hole 119 to form a plurality of slotted holes 120 disposed in an annular array, where one end of the slotted holes 120 close to the blanking hole 119 is formed with an elongated hole 122, and this step prepares for forming of a stator slot 123 so as to avoid deformation due to direct forming.

Step S6, in the process of continuously conveying the metal strip 10 step-by-step, punching an edge of the blanking hole 119 to form a stator center hole, and removing a portion of the elongated hole 122, so that the slotted hole 120 communicates with the blanking hole 119 to form a stator slot 123, and then a stator core sheet preforming area is defined by a periphery of the stator square slot 111; where the combination of step S5 and step S6 avoids deformation of the punched and formed stator slot 123, effectively ensures quality of the stator core sheet 124, and improves production efficiency and quality.

Step S7, in the process of continuously conveying the metal strip 10 step-by-step, attaching the stator core sheet preforming area to the adhesive spraying device 3 located in front of a stator blanking station in the production apparatus, conveying the adhesive in the adhesive cartridge 132 in the first adhesive spraying control device 13 to the first adhesive spraying openings 301 of the adhesive spraying device 3 via the adhesive control apparatus 133, conveying the adhesive in the adhesive cartridge 132 in the second adhesive spraying control device 14 to the second adhesive spraying openings 302 of the adhesive spraying device 3 via the adhesive control apparatus 133, adhering the adhesive sprayed from the first adhesive spraying openings 301 and the second adhesive spraying openings 302 to a lower surface of the stator core sheet preforming area to form the adhesive dots 117, and uniformly distributing the adhesive dots 117 respectively between the stator slots 123 and between the stator slot 123 and the square stator slot 111, where the positions of the first adhesive spraying openings 301 are respectively disposed corresponding to the adhesive dot positions between the stator slots 123, and the positions of the second adhesive spraying openings 302 are respectively disposed corresponding to adhesive dot positions between the stator slots 123 and the stator slots 111, so that the adhesive can be effectively coated, and the adhesive is also brought into effective contact with the accelerating agent.

Step S8, rotating stator core sheet lamination groups in the blanking channel 21 by 360°/N before the stator core sheet 124 is blanked, where N coefficient is 18, so the rotation angle is 20°, and the N coefficient is not limited thereto, and can also be adaptively adjusted according to the shape of the core sheet; then in the process of continuously conveying the metal strip 10 step-by-step, punching the stator core sheet preforming area sprayed with the adhesive dots 117 to form the stator core sheets 124 with a notch, and blanking the same into the blanking channel 21 to cure and bond at normal temperature to top surfaces of the rotor core sheet lamination groups therein through the contact between the adhesive and the liquid so as to form a stator core, where a support hydraulic cylinder is disposed at a lower end surface of the stator core sheet lamination groups in the blanking channel 21, and the support hydraulic cylinder is controlled to descend by a distance equal to the thickness of one stator core sheet 124 once a stator core sheet is punched, so that the core sheets obtained by next punching and forming are laminated and bonded.

In the present embodiment, step S2 specifically comprises the following steps:

Step S21, in the process of continuously conveying the metal strip 10 step-by-step, punching and forming two notch forming holes I 112 which are disposed symmetric to each other, a plurality of notch forming holes II 113 which surround the notch forming holes I and are disposed in an annular array, and a plurality of square stator slots 111 which surround the plurality of notch forming holes II 113 and are disposed in an annular array on one side of a longitudinal center line at a central position of the forming area;

Step S22, in the process of continuously conveying the metal strip 10 step-by-step, punching and forming a notch forming hole III 125 on the other side of the longitudinal center line at the central position of the forming area, and forming a plurality of ventilation holes 114 disposed in an annular array on peripheral areas of the notch forming holes I 112 and the notch forming hole III 125, where the two notch forming holes I 112 and the notch forming hole III are distributed in an annular array;

Step S23, in the process of continuously conveying the metal strip 10 step-by-step, respectively forming a plurality of rotor magnetic steel slots 115 with notches according to the position of each notch forming hole II 113, and punching and forming the square stator slots 111 between the square stator slots 111, where two adjacent rotor magnetic steel slots 115 are obliquely disposed and are symmetric to each other;

Step S24, in the process of continuously conveying the metal strip 10 step-by-step, punching and forming a rotor center hole 116 with a notch according to the center where the notch forming holes I 112 and the notch forming hole III are distributed.

The above-mentioned steps enable the square stator slots 111, the rotor magnetic steel slots 115 with the notches, the rotor center hole 116 with the notch and the ventilation holes 114 to be effectively formed, so as to avoid deformation during the forming process, and also eliminate the step of deliberately designing the notch, improving the production efficiency.

In the present embodiment, there is a step of forming a stator profile notch forming hole between step S5 and step S6, the plurality of square stator slots 111 disposed in an annular array define a square slot forming area, three notch forming areas disposed in an annular array are formed in the square slot forming area, and two square stator slots 111 are disposed in parallel in each notch forming area, so that the three notch forming areas are punched to form a notch forming hole IV, and then a stator core sheet 124 with a profile notch is formed by punching and preforming according to the stator core sheet 124, which uses a preforming mode, so that the stator core sheet 124 with the profile notch is effectively formed, which avoids deformation, and eliminates the step of deliberately forming the profile notch, improving the production efficiency.

The above-mentioned second embodiment achieves the simultaneous production of a plurality of rows of rotor cores and stator cores. Furthermore, large rotary lamination of the stator cores can be achieved.

While the disclosure has been described with reference to the above preferred embodiments, the scope of the disclosure is not limited to thereto, and all the technical schemes under the inventive concept belong to the scope of the disclosure. It should be noted that those of ordinary skill in the art can make several improvements and modifications without departing from the principles of the disclosure, and such modifications and modifications shall be construed to fall into the scope of the disclosure.

What is claimed is:

1. A production apparatus of a motor laminated core, the motor laminated core being formed by laminating and bonding a plurality of core sheets to each other, and respective core sheets being formed by punching a predetermined shape on a metal strip; wherein the production apparatus comprises:

an upper die assembly and a lower die assembly, wherein the upper die assembly and the lower die assembly cooperate with each other so as to sequentially cut the metal strip conveyed step-by-step into the core sheet with the predetermined shape and blank the core sheet; and an adhesive spraying device, wherein the adhesive spraying device is disposed on the lower die assembly; and the adhesive spraying device comprises an adhesive spraying plate, a first die plate and a second die plate, the first die plate is disposed between the adhesive spraying plate and the second die plate, a first adhesive spraying area and a second adhesive spraying area located at a periphery of the first adhesive spraying area are formed on the adhesive spraying plate, a plurality of first adhesive spraying openings disposed at intervals from each other are formed in the first adhesive spraying area, and a plurality of second adhesive spraying openings disposed at intervals from each other are formed in the second adhesive spraying area, a front face of the first die plate is formed with a plurality of first diversion channels respectively communicating with the first adhesive spraying openings, a first adhesive inlet channel communicating with the first diversion channels, and a plurality of transition channels respectively communicating with the second adhesive spraying openings correspondingly, and a front face of the second die plate is formed with a plurality of second diversion channels respectively communicating with the transition channels, and a second adhesive inlet channel communicating with the second diversion channels; and the first adhesive inlet channel is disposed on the first die plate in a penetrating manner, and the second adhesive inlet channel is disposed on the second die plate in a penetrating manner.

2. The production apparatus of a motor laminated core according to claim 1, wherein the front face of the first die plate is further formed with a first diversion cavity, the first diversion cavity communicates with the first adhesive inlet channel, and the first diversion channels respectively communicate with the first diversion cavity.

3. The production apparatus of a motor laminated core according to claim 1, wherein the front face of the second die plate is formed with a second diversion cavity, the second diversion cavity communicates with the second adhesive inlet channel, and the second diversion channels respectively communicate with the second diversion cavity.

4. The production apparatus of a motor laminated core according to claim 3, wherein the front face of the first die plate and the front face of the second die plate are both formed with a plurality of communicating grooves disposed in an annular array; the communicating grooves on the first die plate are respectively located between the plurality of first diversion channels, so that the plurality of first diversion channels communicate with each other via the communicating grooves; the communicating grooves on the second die plate are respectively located between the plurality of second diversion channels, so that the plurality of second diversion channels communicate via the communicating grooves; and the first adhesive spraying area and the second adhesive spraying area are both in an annular structure, positions of the communicating grooves on the first die plate are respectively disposed corresponding to a position of the first adhesive spraying area of the annular structure, positions of the communicating grooves on the second die plate are respectively disposed corresponding to a position of the second adhesive spraying area of the annular structure, and the plurality of first adhesive spraying openings are uniformly distributed at equal intervals, and the plurality of second adhesive spraying openings are uniformly distributed at equal intervals; and the first adhesive spraying openings communicate with the first diversion channels via the communicating grooves on the first die plate, the second adhesive spraying openings communicate with the second diversion channels via the transition channels and the communicating grooves on the second die plate, a third adhesive inlet channel communicating with the first adhesive inlet channel is formed on the second die plate, and the third adhesive inlet channel is disposed on the second die plate in a penetrating manner.

5. The production apparatus of a motor laminated core according to claim 4, further comprising a positioning structure for guiding and limiting the metal strip during the step-by-step conveying, wherein the positioning structure is disposed on the lower die assembly, and the positioning structure comprises a side guide plate and a magnet, the side guide plate is formed with a positioning groove, the magnet is embedded in an upper inner wall of the positioning groove, a side edge of the metal strip is located in the positioning groove, and the magnet separates the metal strip from an upper surface of the lower die assembly by a magnetic force thereof.

6. The production apparatus of a motor laminated core according to claim 5, wherein a metal strip conveying channel is formed between the upper die assembly and the lower die assembly, a nozzle is disposed in front of a feeding end of the metal strip conveying channel, the nozzle sprays a mixed liquid of a stamping oil and an accelerating agent onto a surface of the metal strip, and the mixed liquid is mixed with an adhesive respectively sprayed from the first adhesive spraying openings and the second adhesive spraying openings, so that the plurality of core sheets are laminated and bonded to each other to form the motor laminated core.

7. The production apparatus of a motor laminated core according to claim 6, further comprising a first adhesive spraying control device and a second adhesive spraying control device, wherein the first adhesive spraying control device and the second adhesive spraying control device each comprise a controller, an adhesive cartridge and an adhesive control apparatus, a gas pressure reducing valve in the controller is butt-jointed with a gas inlet port of the adhesive cartridge via a gas pipeline, and the adhesive control apparatus is connected with and controlled by a control module in the controller; a discharge port of the adhesive cartridge is butt-jointed with an adhesive inlet of the adhesive control apparatus via a pipeline, a pressure sensor is mounted at an adhesive outlet of the adhesive control apparatus, and the pressure sensor is connected with and controlled by the control module in the controller; and the adhesive outlet of the adhesive control apparatus of the first adhesive spraying control device is butt-jointed with the third adhesive inlet channel via a pipeline, and the adhesive outlet of the adhesive control apparatus of the second adhesive spraying control device is butt jointed with the second adhesive inlet channel via a pipeline.

8. The production apparatus of a motor laminated core according to claim 7, further comprising a lifting device; wherein the adhesive spraying device further comprises an insert ring fixed on the second die plate, the first die plate and the adhesive spraying plate are disposed in an inner cavity of the insert ring, a protrusion is formed on an inner wall of the insert ring, a step is formed on the adhesive spraying plate, and the protrusion is limited on the step; the lifting device comprises an drawing plate, a drawing plate cushion block fixed on the second die plate, a guide assembly and a reset assembly, a bottom surface of the drawing plate cushion block and a top surface of the drawing plate are respectively formed with a plurality of mating tooth blocks via a plurality of mating grooves disposed at equal intervals from each other, and the mating tooth blocks are correspondingly inserted into the mating grooves; a side wall of the mating groove on the drawing plate cushion block and a side wall of the mating groove on the drawing plate are attached to each other, and both side walls attached to each other are inclined planes with a same inclination angle, and an extension section of the drawing plate penetrates through the channels and is connected with a cylinder located on the lower die assembly; the guide assembly comprises a guide post fixed on the drawing plate cushion block and a guide post bushing mounted on the lower die assembly, and the guide post is inserted into the guide post bushing; and the reset assembly comprises a sleeve mounted on the lower die assembly, and a spring and a column disposed in the sleeve, the column is connected with the drawing plate cushion block, and both ends of the spring are connected with the sleeve and the column respectively.

9. A method for producing a motor laminated core, comprising manufacturing a laminated core using the production apparatus of a motor laminated core according to claim 1, wherein the method comprises the following steps:
conveying a metal strip continuously step-by-step in a blanking direction, and spraying a mixed liquid for catalyzing an adhesive on an upper surface of the metal strip before entering between an upper die assembly and a lower die assembly of the production apparatus;
disposing the metal strip between the upper die assembly and the lower die assembly of the production apparatus, and in the process of conveying the metal strip continuously step-by-step in the blanking direction, attaching a core sheet preforming area to an adhesive spraying device in the production apparatus, conveying the adhesive in an adhesive cartridge in a first adhesive spraying control device to first adhesive spraying openings of the adhesive spraying device via an adhesive control apparatus, conveying the adhesive in the adhesive cartridge in a second adhesive spraying control device to second adhesive spraying openings of the adhesive spraying device via the adhesive control apparatus, adhering the adhesive sprayed from the first adhesive spraying openings and the second adhesive spraying openings to a lower surface of the core sheet preforming area, and uniformly distributing adhesive dots on the lower surface of the core sheet preforming area; and
in the process of conveying the metal strip continuously step-by-step, punching the core sheet preforming area coated with the adhesive on the metal strip to form core sheets, and blanking the core sheets into a blanking channel and curing and bonding with a top surface of a core sheet lamination group inside the blanking channel by contacting the adhesive with the mixed liquid so as to form a laminated core; and during the curing and bonding, bonding at 15° C. to 35° C. for 10 s to 3 min, and pressing the formed core sheet by a forming die of the upper die assembly, and subjecting the core sheet lamination group to a back pressure of a hydraulic cylinder and a clamping force of a locking ring, so that the formed core sheet is tightly bonded to the top surface of the core sheet lamination group.

10. The method for producing a motor laminated core according to claim 9, wherein the metal strip is conveyed continuously step-by-step in the blanking direction by pushing forward and pulling backward;
the adhesive dots are located at an outer edge of the core sheet after the adhesive is coated, or
the adhesive dots are located at an edge of a shaft hole on the core sheet after the adhesive is coated, or
the adhesive dots are located on a periphery of a magnetic steel slot on the core sheet after the adhesive is coated, or
at least one adhesive dot is adhered to each of a plurality of tooth portions on the core sheet after the adhesive is coated.

\* \* \* \* \*